(12) United States Patent
Robinson

(10) Patent No.: US 8,002,550 B1
(45) Date of Patent: Aug. 23, 2011

(54) GRADUATED GRID SYSTEM USED IN THE INSTRUCTION OF DRAWING AND PAINTING

(76) Inventor: James N. Robinson, St. Paul, MN (US)

( * ) Notice: Subject to any disclaimer, the term of this patent is extended or adjusted under 35 U.S.C. 154(b) by 1396 days.

(21) Appl. No.: 11/487,013

(22) Filed: Jul. 17, 2006

(51) Int. Cl.
*G09B 11/00* (2006.01)
(52) U.S. Cl. .......................................... 434/90; 434/85
(58) Field of Classification Search ...................... 434/85
See application file for complete search history.

(56) References Cited

U.S. PATENT DOCUMENTS

| | | | | |
|---|---|---|---|---|
| 228,273 A | * | 6/1880 | Peabody | 33/277 |
| 2,626,467 A | * | 1/1953 | Abbott | 434/81 |
| 5,513,991 A | * | 5/1996 | Reynolds et al. | 434/81 |
| 6,568,938 B1 | * | 5/2003 | Prince et al. | 434/90 |

* cited by examiner

*Primary Examiner* — Xuan M Thai
*Assistant Examiner* — Evan R Page
(74) *Attorney, Agent, or Firm* — Law Offices National, P.A.

(57) ABSTRACT

Children and adults interested in the visual arts often have trouble mastering basic drawing and painting skills due to a lack of structured instruction. A device composed of gridded drawing and painting apparatus is used to eliminate ongoing frustration that can occur during artistic training. Supporting charts and equipment used to maximize efficiency are also provided. A method to operate the device to its maximum potential is supplied. Procedures to advance a pupil through various stages of development are set forth. Alternate working methods that target the specific needs of various artists and art students are proposed. A routine for identifying optimal results is set forth, along with methods to measure that success. Examples of student artwork verify the logic of a system that ensures positive results.

20 Claims, 22 Drawing Sheets
(9 of 22 Drawing Sheet(s) Filed in Color)

DRAWING TIPS

18 —

1. Relax
2. Concentrate
3. Draw lightly
4. Big shapes first
5. Compare back and forth
6. Turn it upside down
7. Find mistakes
8. Put arrows down
9. Turn it right side up
10. Correct mistakes 11. Erase arrows
12. Check positive and negative shapes
13. Correct mistakes
14. Stop and rest
15. Check it again
16. Correct mistakes
17. Raise your hand and ask for help — 49
18. Ghost your line
19. Add details
20. Ask for help one last time

*Remember: Always work from large to small* — 50

FIG. 17

INKING TIPS

19 —

1. Keep your pen tips clean
2. Outline your shapes—use your thin pen tip
3. Add line variety—use your thick pen tip — 51
4. Smooth out your line—use your thin pen tip
5. Ask a teacher to check your picture
6. Blow dry your picture
7. Erase all your pencil lines

*Find line variety by comparing three line thicknesses* — 52

FIG. 18

COLOR MIXING TIPS
1. Hold your brush back.
2. Transfer enough water into your mixing tray.
3. Boldly add pigment.
4. Stir your color.
5. Test your color along the edge of the paper.
6. Ask yourself: Is it too light, too dark, or just right!
7. To *lighten* a color—add water.
   To *darken* a color—add pigment.
   To *dull* a color—add black.
8. Ask a teacher to check your color.

FIG. 23

WATERCOLOR TIPS
1. Work wet
2. Always stir your color.
3. Always work from top to bottom.
4. Keep your paper at a 30° angle.
5. Overlap each stroke by 1/2.
6. Keep all of your wash moving down together.
7. Don't stop until your wash is finished.
8. Soak up any extra paint.
9. Always work from:  Light to dark
                     Large to small

FIG. 24

GRADUATED GRID SYSTEM USED IN THE INSTRUCTION OF DRAWING AND PAINTING

FIELD OF THE INVENTION

The present invention relates to a system of grids used in succession with formulated drawing and painting steps and any necessary shape isolators, charts and palettes, as a method of traditional drawing and painting instruction, which insures dependable and measurable skill development in both child and adult artists and art students.

BACKGROUND OF THE INVENTION

Typically, children and adult art students struggle to become proficient in drawing and painting because instruction in most art institutions is not systematic. Predictably, students taught in such environments often experience ongoing frustration as they strive to develop their skills. Such unfocused labor frequently compromises artistic development. To date there is not a comprehensive system that improves the drawing and painting abilities of beginning to advanced art students in a logical and efficient way. The graduated grid system expands on alternative methods, providing a necessary structure that produces dependable and measurable results. This method is especially significant because it gives art students greater freedom by saving them time from doing repetitive exercises that do not guarantee a positive outcome. The system also increases confidence and self-esteem within an artist and facilitates greater creativity because of continuing, increased skill development.

The present invention optimizes results by including shape isolators, charts that define step-by-step drawing and painting procedures, links to art history concerning lessons being learned, and gridded painting palettes that aid teachers in facilitating the graduated grid system. These additions allow the invention to be tailored to each student's individual needs.

Grids as a drawing device have been in use since antiquity. Traditionally, their function has been to transfer an image from one support to another. An example of this occurred during the Renaissance, when artists would transfer a drawing to a plastered wall, which was to be painted in fresco, by gridding that drawing. What makes the current invention innovative and unique is that distinctive grids are used in succession within a device and following a method which has proven to insure dependable results in the instruction of ongoing artistic skill development. This goes well beyond the scope and focus of substitute practices, allowing that student to optimize potential at each stage of the learning process.

SUMMARY OF THE INVENTION

The graduated grid system is a teaching aid in the instruction of drawing and painting. Drawing skills are improved by placing an image underneath a grid and copied onto a sheet of drawing paper with an identical grid drawn onto it. Several steps are taken to ensure optimum results and improvement of the student's drawing from one grid and image to the next. The student first learns to break the image down into an arrangement of basic shapes from which to draw from. This is done by tracing the image's basic shapes with a china marker (or equivalent) on top of the plastic sheet containing the image and grid. A blank sheet of paper is then inserted underneath the grid on top of the image. This step isolates the image's basic shapes and conceals all of the image's details. The student then begins to draw on the attached gridded drawing paper utilizing twenty drawing steps and any shape isolators that may be necessary. During these steps the student learns about important drawing concepts, such as positive and negative shapes, the idea that large basic shapes make up a whole cohesive image, and the necessity to draw lightly. Once all basic shapes are drawn satisfactorily in relation to the grid the china marker crayon is rubbed off, the blank sheet of isolating paper is removed, and the student completes the drawing. This final step emphasizes line variation and the importance of detail being properly placed within the overall composition of big shapes. The drawing is then ready to be 'finished' in the appropriate medium in which the original image was executed. Step-by-step procedures aid the student in completing a picture precisely and accurately. As a student's abilities improve they 'graduate' from one grid level to the next. By advancing through the grid system the student becomes more knowledgeable and skilled and less dependent on outside drawing and painting tools when trying to faithfully reproduce an image. Historical charts featuring artwork and quotes of famous artists help place skill development within the context of art history. Gridded painting palettes further ensure successful color mixing for students who have progressed to advanced levels of finish. At the conclusion of employing all devices within the graduated grid system a student's eye has become properly trained to see proportional relationships well and motor skills have developed to support these advances. In addition, the student has learned a reliable drawing and painting process. These strengths allow that student to reproduce images accurately by freehand without the use of any drawing aids whatsoever and lays a solid foundation for producing personal, more creative work. Consequently, the present invention significantly enhances the effectiveness of skill development within art students whose focus is improving their drawing and painting abilities.

DESCRIPTION OF THE DRAWING

The patent or application file contains at least one drawing executed in color. Copies of this patent or patent application publication with color drawings will be provided by the Office upon request and payment of the necessary fee. The structure and advantages of the present invention are explained with particularity hereinafter by referring to the drawings briefly described as follows:

FIG. 17 is a chart of drawing tips which explains how the device is more specifically used;

FIG. 18 is a chart of inking tips which explains how completed drawings may be finished in pen and ink;

FIG. 23 is a chart of color mixing tips which explains a procedure for successful color mixtures;

FIG. 24 is a chart of watercolor tips which explains how completed drawings may be finished in watercolor;

DETAILED DESCRIPTION OF THE INVENTION

Figure 1:
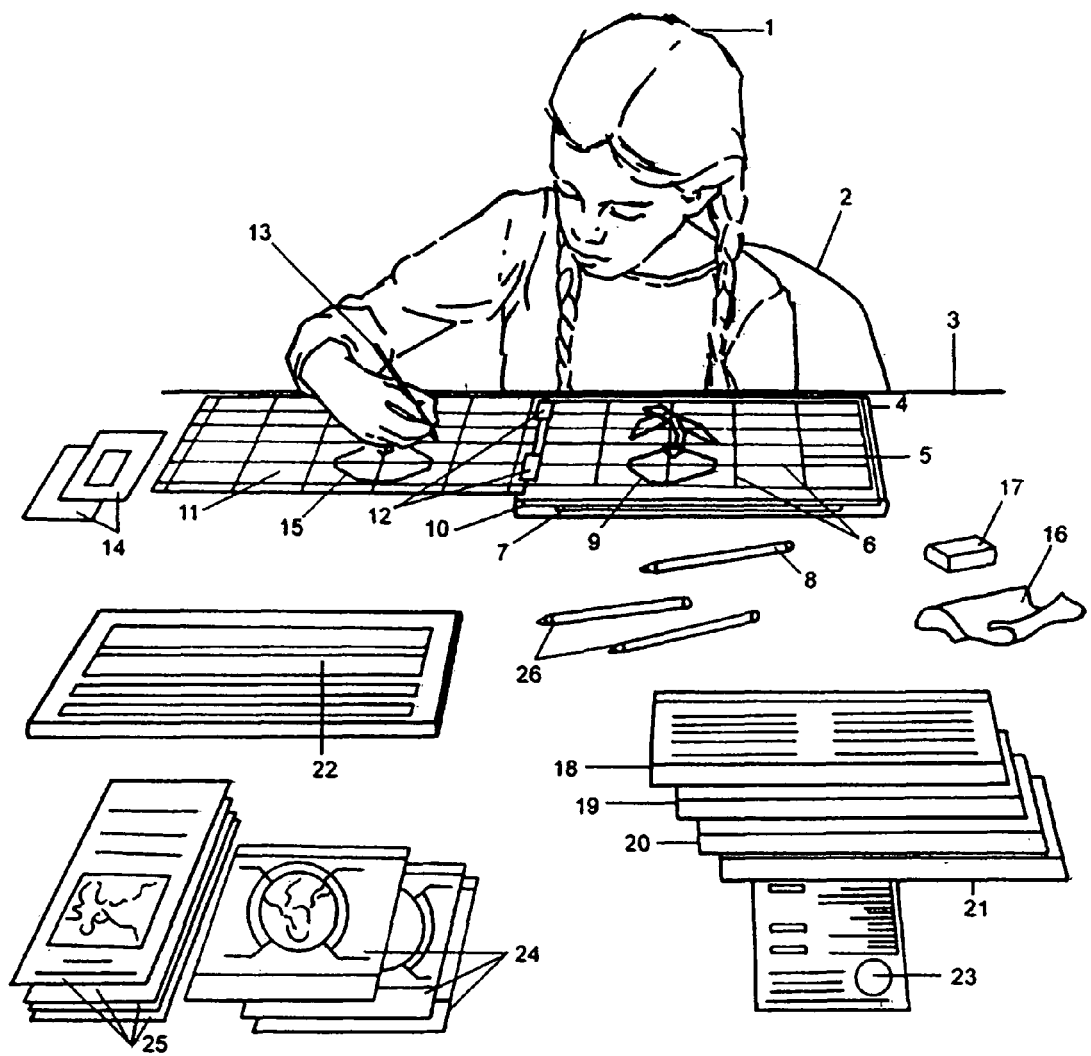
FIG. 1 is an illustration of an art student operating the current invention useful for optimizing drawing and painting abilities from beginning to advanced skill levels in accordance with the present invention.

The purpose and capability of the graduated grid system as a teaching aid of drawing and painting relies on two parts, the materials and the methods. Referring then to the drawings wherein reference numerals designate identical and corresponding parts throughout the accompanying figures, and more particularly to FIG. 1, a person who is a young art student 1 is shown operably engaged with the device in accordance with the present invention. Specifically, FIG. 1 depicts student 1 beginning a drawing 15 using the aid of grid 5 composed of twenty-five rectangles.

Figure 2:
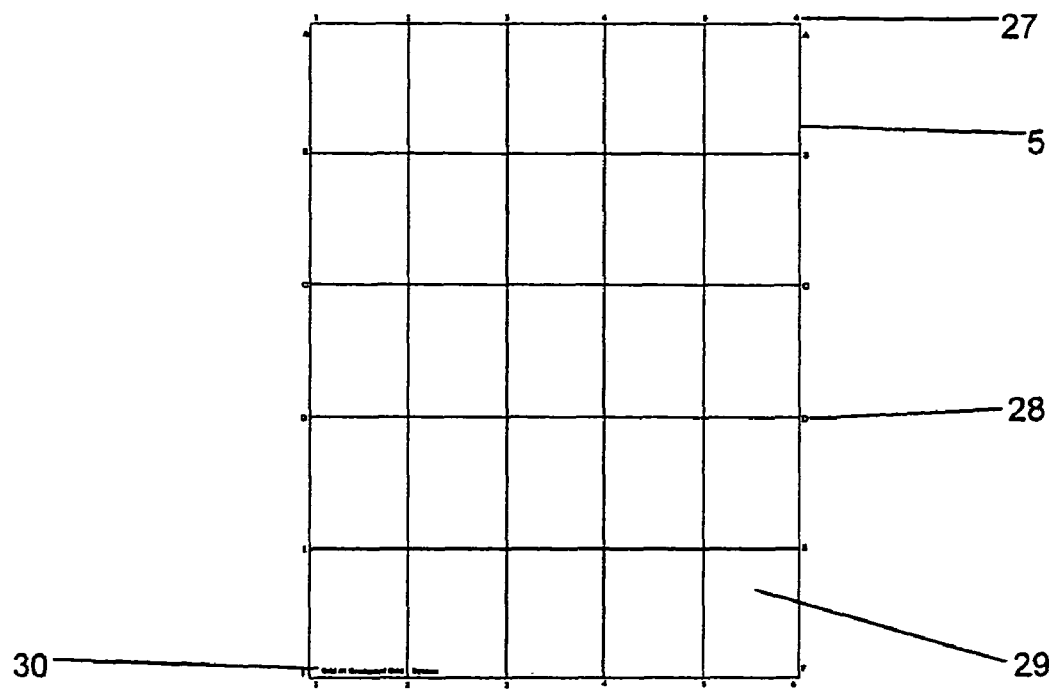
FIG. 2 is a diagram of the first grid used and comprised of twenty-five equally-sized rectangles used in accordance with the present invention.

As illustrated in FIG. 2 through FIG. 6, the grids most commonly used, a student would initially reproduce an image or images with the aid of grid 5 composed of twenty-five equally-sized rectangles 29, as pictured in FIG. 2. After drawing skills improve the student would then advance to reproduce another image or images, replacing grid 5 with grid 31, composed of sixteen equally-sized rectangles 32, as pictured in FIG. 3; then advance to reproduce yet another image or images with grid 33, composed of nine equally-sized rectangles 34, as pictured in FIG. 4. Upon the successful completion of reproducing an image or images using grid 33, grid 35 would be employed. As pictured in FIG. 5, this grid is composed of four equally-sized rectangles further divided by diagonals that extend from corner to corner 36 to form a grid of eight equally-sized triangles 37. Grid 38 is the final grid to be used by a student in the series, being composed of four equally-sized rectangles 39, as pictured in FIG. 6. By using the grids according to the described system, which subdivides images with increasingly fewer divisions, the student gradually learns to see the proportional relationships of shapes within a compositional whole. Gridlines 6, denoted in FIG. 1, serve as a useful method of separating an image into smaller, more manageable partitions to work within, while providing points of measurement to accurately judge the size of that image. Grids 5, 31, 33, 35 and 38 also create a format in which positive and negative shapes become an important focus of the drawing process. (The term 'positive shape' in an artistic sense refers to the shape of the image being drawn, while the term 'negative shape' refers to the blank 'left over' shapes that surround and touch that image.)

Though it is typical that a student would begin using the apparatus starting with grid 5, the flexibility of the graduated grid system allows the device to be tailored to each student's individual skill level. A more experienced student could conceivably begin drawing using a more advanced grid. This is exemplified in FIGS. 11 through 16, where the same image being drawn utilizing grid 5 in FIG. 1 is being drawn utilizing grid 31.

Note that grids 5, 31, 33, 35 and 38 are constructed of clear plastic sheeting with equally spaced black lines 6 printed on them. Grids 5, 31, 33, 35 and 38 are divided evenly along their horizontal and vertical axes, producing an identical number of rectangular spaces going across and down each grid. Numbers 27 and letters 28, shown in FIG. 2, help a student navigate the placement of shapes within a grid, while labels 30 categorize what level of grid is being used within the graduated grid system. Grids 5, 31, 33, 35 and 38 are encased within plastic sleeves 4 and may be used in either a horizontal or vertical format. For the purposes of this description it will be assumed that all grids and their accessories are being operated in the vertical position, as pictured in FIG. 1.

Figure 7:
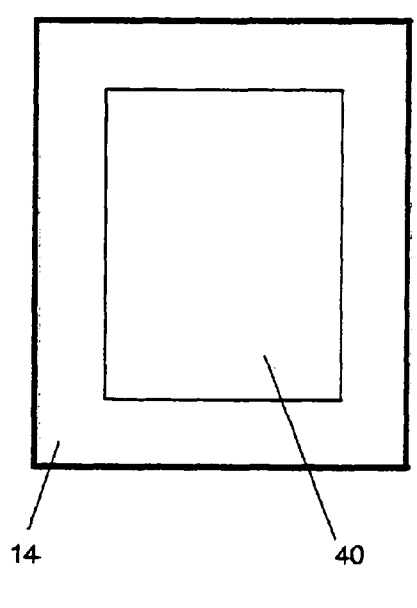
FIG. 7 is a depiction of a single, basic shape isolator which covers all but one rectangle of a grid.
Figure 8:
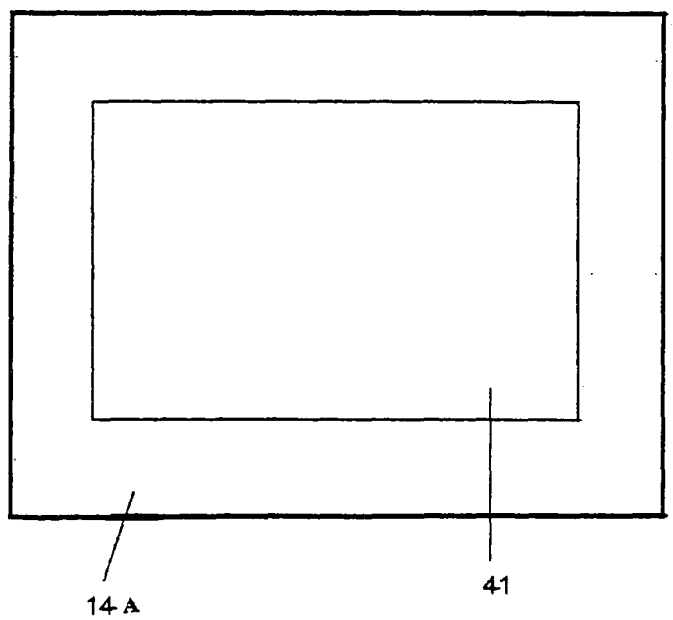
FIG. 8 is a depiction of a double shape isolator which covers all but two adjoining rectangles of a grid that align horizontally.
Figure 9:
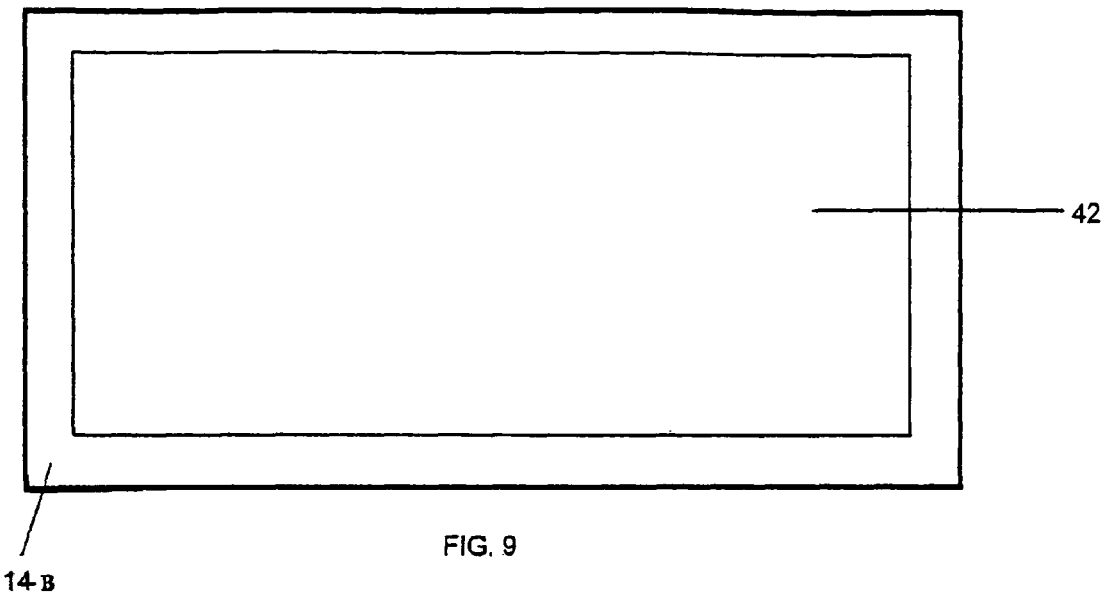
FIG. 9 is a depiction of a triple shape isolator which covers all but three adjoining rectangles of a grid that align horizontally.
Figure 10:
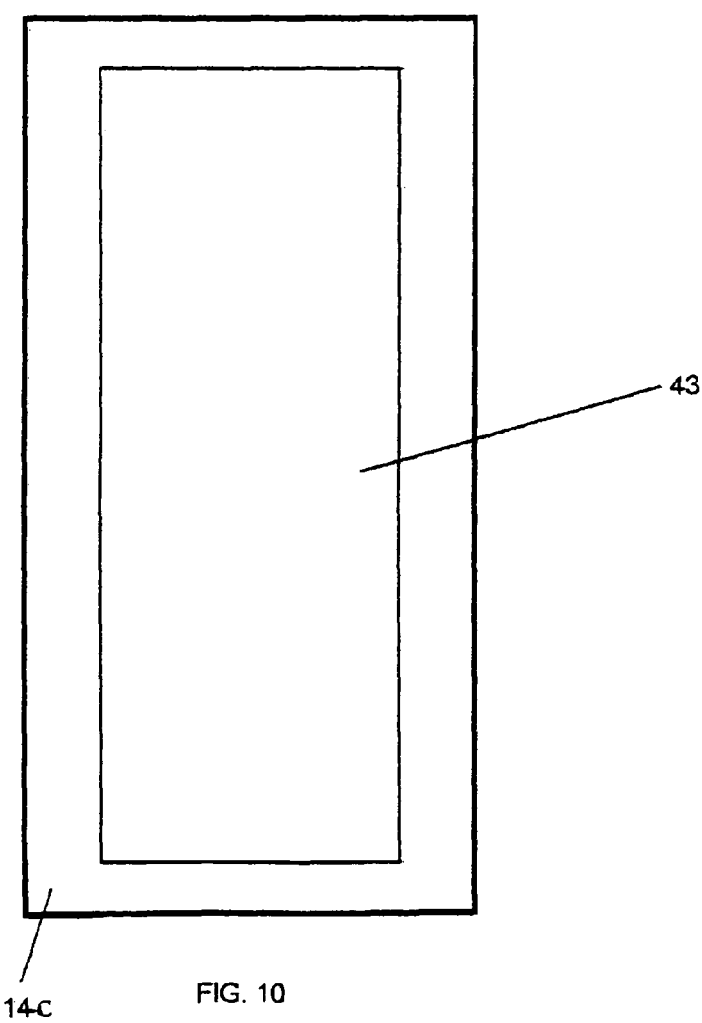
FIG. 10 is a depiction of a final shape isolator which covers all but two adjoining rectangles of a grid that align vertically.

A beginning student may at first have difficulty using grid 5 as a means to accurately place basic shapes 9 of an image upon gridded paper 11. If this problem occurs shape isolators 14 are used to help the student focus on drawing one area at a time. FIG. 7 is a depiction of a single, basic shape isolator 14. It is a rectangle constructed of laminated paper or plastic. In the center of shape isolator 14 a window 40 is cut that is the size of one of the grid's rectangles. Shape isolators with identical window sizes are always used in pairs. One shape isolator is fastened to plastic sleeve 4 over one of its rectangles. This separates out a portion of grid 5, with a section of the basic shapes 9 of an image drawn on it, from its surroundings. A matching shape isolator is used to identify the similarly located rectangle on drawing paper 11. This arrangement allows a student to see a part of the basic shapes 9 of an image in isolation from its setting, and helps facilitates easy drawing. Once the student has accurately duplicated the image fragment seen within the shape isolators 14 they are removed, being replaced by two shape isolators 14A as appear in FIG. 8. These isolators have windows 41 designed in them to expose two horizontal grid rectangles. The new isolators 14A are positioned to reveal the area previously drawn, plus one adjoining rectangle containing a fragment of the basic shapes 9 of an image. This arrangement allows the student to relate and duplicate the lines and shapes revealed in the first shape isolator 14 to the area adjoining it. After this is accomplished the student may then move on to a pair of shape isolators 14B as depicted in FIG. 9, containing a window 42 revealing three horizontal rectangles. These are then positioned to reveal the last two areas drawn plus another image fragment. The student now clearly sees the relationship of line and proportion from one area to the next and completes the drawing of the three related rectangles. A pair of stacked shape isolators 14C as depicted in FIG. 10 is used when it is appropriate to employ a window 43 to reveal two rectangles that are arranged in a vertical format. By utilizing shape isolators 14, 14A, 14B and 14C in the sequence given a person with very little drawing experience can adapt to the current device easily.

Figures 11, 12:
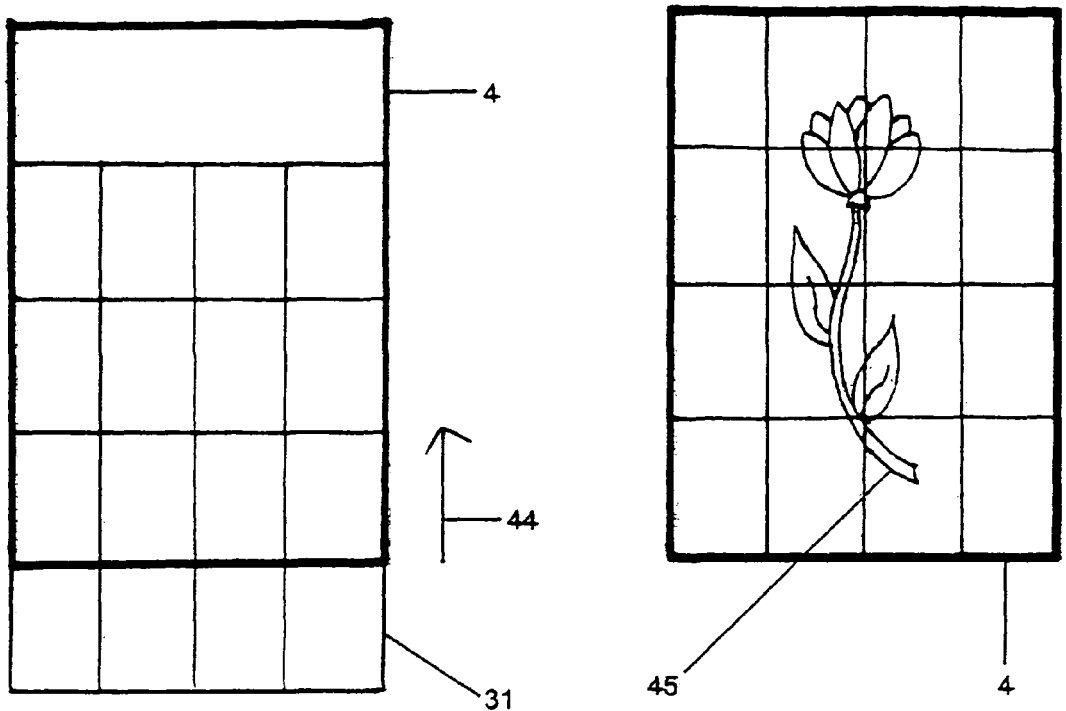
FIG. 11 is a diagram that shows the first step in using the grid system in that a grid is inserted into a plastic sleeve.
FIG. 12 is a diagram that shows the second step in using the grid system in that the image to be reproduced is inserted into that plastic sleeve and underneath the grid.

Returning to FIG. 1, it can be seen that grid 5, along with a sheet of paper 7 with an original image printed on it, hidden from sight in the cross-section view of FIG. 1, but clearly visible as original image 45 in FIG. 12, and a blank sheet of paper 10, are all encased within plastic sleeve 4, which easily keeps the materials together neatly. A typical grid 31 will just fit in its plastic sleeve 4 when inserted inside the sleeve, as shown by arrow 44 in FIG. 11.

Figure 13:
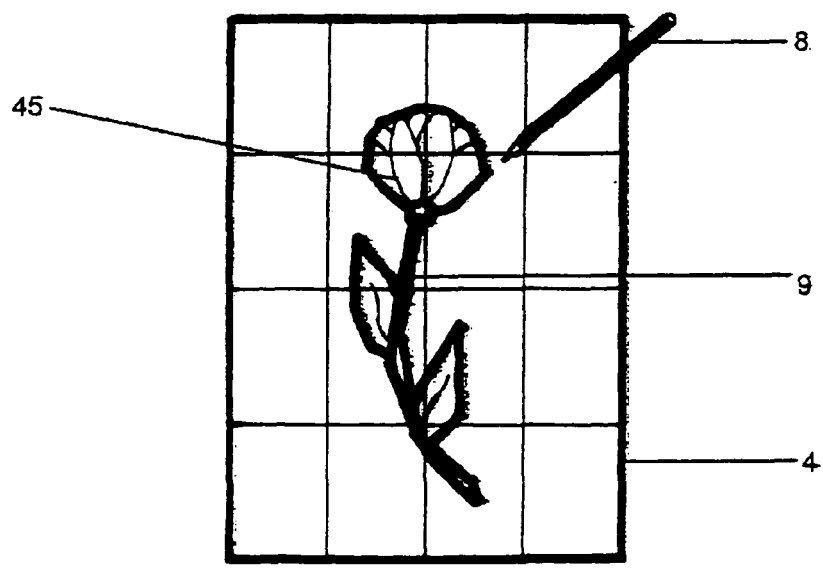
FIG. 13 is a diagram that shows the third step in using the grid system in that the original image is broken down into basic shapes by drawing on the plastic sleeve with a china marker (or equivalent)

When using the apparatus an image to be copied is preferably chosen by a student from a collection of image samples selected by an instructor. These images are most beneficial if chosen from the works of noted painters and draughtsman throughout the course of history, thus allowing a student to profit from another's expertise. The image that has been chosen is then inserted inside plastic sleeve 4 and underneath grid 5 as shown in FIG. 1. Once in place underneath the grid, the student uses a china marker 8 or equivalent to outline the basic shapes 9 of the image directly onto plastic sleeve 4. FIG. 13 demonstrates how a student might break down an image from its original form 45 into basic shapes 9 using simple straight lines. This innovative step of shape simplification is important in teaching the student how to distinguish details from the larger compositional structure of the picture as well as to set up basic parameters or landmarks from which to work from later. Curved lines, for example, would be drawn as straight lines where the outermost part of the curve would be represented and drawn as an angle where two straight lines meet. It also breaks the image into clearer, more definable shapes where line variation or value (the lightness or darkness of an area) takes no part, and the two-dimensional characteristics of the drawing are clearly and easily defined, such as the relationship between positive and negative shapes.

Figure 14:
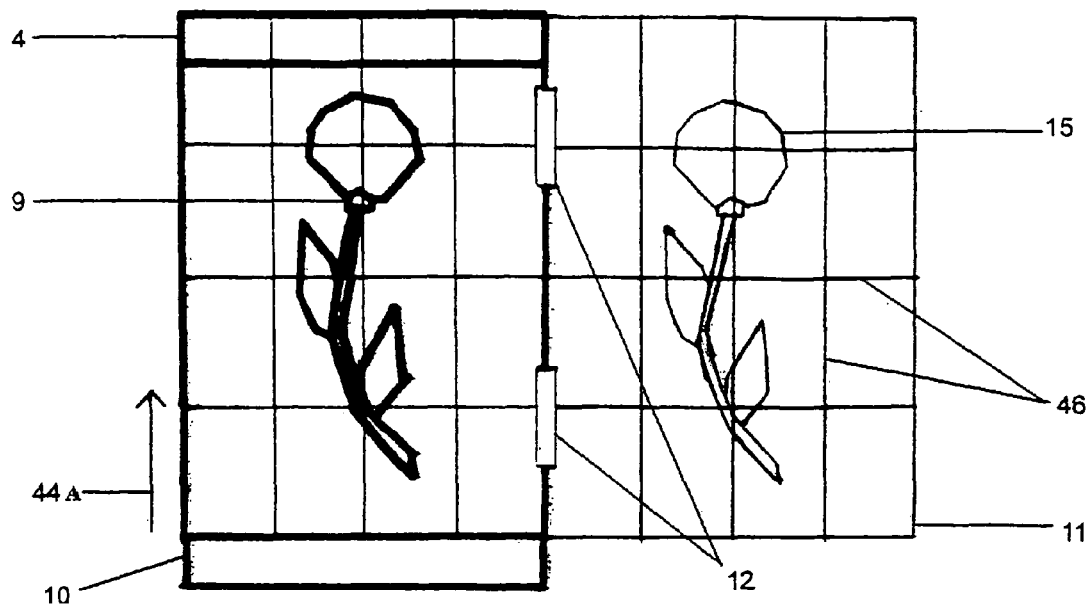
FIG. 14 is a diagram that shows the fourth step in using the grid system in that a blank sheet of paper is inserted into the plastic sleeve underneath the grid, covering the detailed original image and emphasizing its basic shape china marker image, as a sheet of drawing paper with an identical grid drawn onto it is taped to that plastic sleeve, and a student then draws similar basic shapes onto this attached gridded paper.

After basic shapes 9 have been drawn over the top of original image 45 onto gridded plastic sleeve 4, as appears in FIG. 13, a sheet of drawing paper 11 with an identical grid 46 drawn lightly onto it is attached with tape 12 to plastic sleeve 4, as appears in FIG. 14. Paper 11 is placed on the left side of plastic grid 4 for left-handed people and on the right side of plastic grid 4 for right-handed people, thus allowing each to draw freely without their writing hands ever covering the image they are intent on copying.

Subsequently, a blank sheet of paper 10 is inserted over the original image, but underneath the grid, as shown by arrow 44A in FIG. 14, so that the original image is concealed from view and the basic shapes 9, drawn in china marker 8, are clearly revealed.

FIG. 1 demonstrates the next step in the use of the apparatus. Student 1 comfortably sits in chair 2 and positions the drawing device on table 3. The student is then ready to draw using pencil 12 onto the adjoining gridded paper 11. The end result of this step is depicted in FIG. 14, where drawing 15 is shown completed.

It is important to note that a chart of drawing tips 18, referenced in FIG. 17, aids the student on how to proceed. Twenty drawing steps 49 and one reminder 50 are listed, and have been compiled to help the student in the drawing process from beginning to end. Once student 1 is positioned to begin drawing, the steps are as follows:

1. Relax.
  2. Concentrate.
  3. Draw lightly.
  4. Draw big shapes first.
  5. Compare back and forth.
  6. Turn it upside down.
  7. Find mistakes (fifteen minimum).
  8. Put arrows down.
  9. Turn it right side up.

10. Correct mistakes.
11. Erase arrows.
12. Check positive and negative shapes.
13. Correct mistakes (ten minimum).
14. Stop and rest.
15. Check it again.
16. Correct mistakes (five minimum)
17. Raise your hand and ask for help.
18. Ghost your line.
19. Add details.
20. Ask for help one last time.

Figure 15:
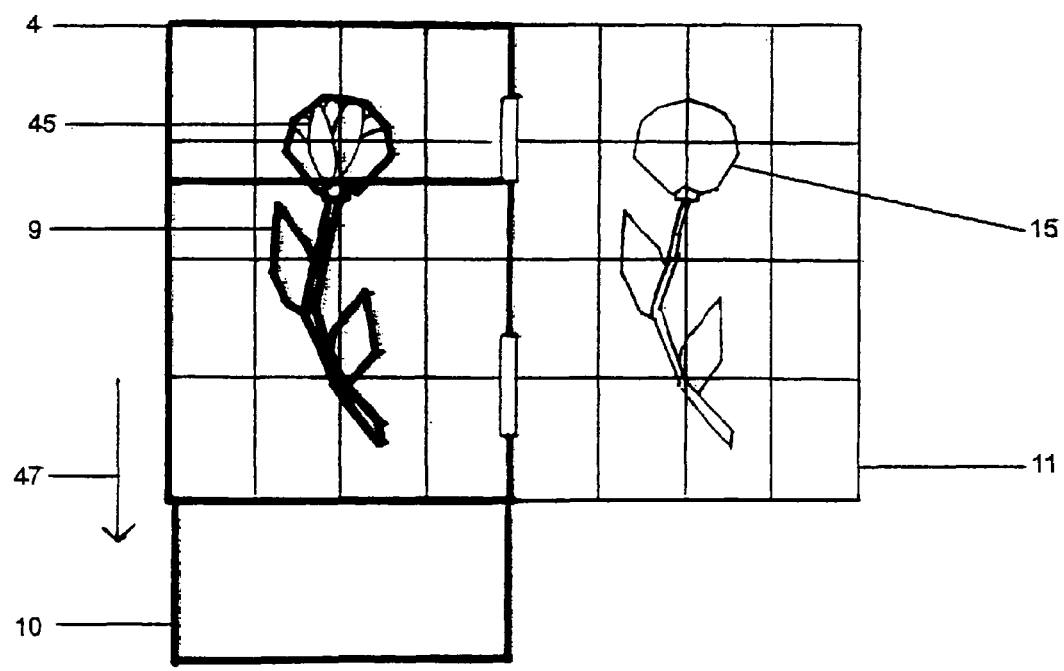
FIG. 15 is a diagram that shows the blank paper being removed once the basic shapes have been properly drawn.
Figure 16:
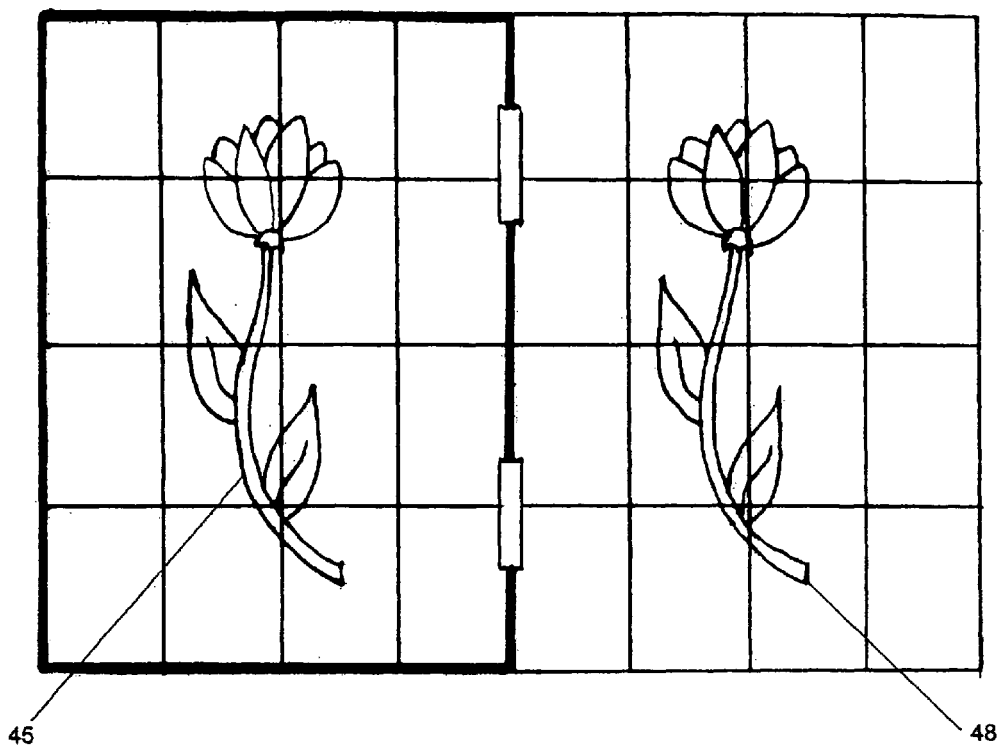
FIG. 16 is a diagram that shows the china marker is rubbed off and the original image is now visible and the drawing completed.

Referring to FIG. 1, explanation of the twenty drawing steps follow:

1. Relax. The student is encouraged to approach the drawing process with a calm attitude.
2. Concentrate. The student is encouraged to focus on the drawing lesson at hand and ignore any outside stimuli.
3. Draw lightly. The student is encouraged to draw with a light pencil pressure so erasures may be made easily.
4. Draw big shapes first. The student is encouraged to concentrate on big, simple structural shapes when drawing, ignoring all superfluous detail.
5. Compare back and forth. The student is encouraged to compare the drawing 15 with what is being copied 9. This facilitates accuracy in shape.
6. Turn it upside down. The student is encouraged to rotate the plastic grid 4 and taped drawing paper 11 so both images appear upside down when being viewed. This is done because after concentrated work the human eye gets fatigued and can no longer see shapes well. By turning the image upside down eyes can see proportions afresh and find drawing mistakes easily.
7. Find mistakes (fifteen minimum). The student is encouraged to look for errors in proportion between the original image simplified into basic shapes 9 in china marker 8 and drawing 15. This is accomplished when the student visually compares like areas between the simplified image 8 and drawing 15. Ideally, a minimum of fifteen mistakes should be located at this stage of the drawing process.
8. Put arrows down. The student is encouraged to record the discovered inconsistencies in shape by penciling light arrows down on the drawing at points of error.
9. Turn it right side up. The student is encouraged to rotate the plastic grid 4 and taped drawing paper 11 back to its original position. This allows for mistake corrections made in Step 10 to be easily executed and again relaxes the student's eyes.
10. Correct mistakes. The student is encouraged to correct the mistakes found on drawing 15 in Step 7.
11. Erase arrows. The student is encouraged to erase the arrows used to record the mistakes found in Step 8.
12. Check positive and negative shapes. The student is encouraged to improve drawing 15 a second time by checking positive and negative shapes. (The term 'positive shape' in an artistic sense refers to the shape of the image being drawn, while the term 'negative shape' refers to the blank 'left over' shapes that surround and touch that image.) This is accomplished when the student visually compares like negative shape areas between the simplified china marker image 9 and drawing 15.
13. Correct mistakes (ten minimum). The student is encouraged to locate and correct a minimum of ten positive and negative shape errors on drawing 15.
14. Stop and rest. The student is encouraged to take a break from the drawing process as extended concentrated work on drawing tends to fatigue the eye and hand. Without the inclusion of this vital step the chances of mistakes increase in the finishing stages of the drawing process.
15. Check it again. After taking the short break as described in Step 14, the student is encouraged to check drawing 15 again against the simplified china marker image 9 through visual comparison to see if any further corrections are necessary.
16. Correct mistakes (five minimum). The student is encouraged to correct the errors found on drawing 15 in Step 15. A minimum of five mistake improvements are suggested.
17. Raise your hand and ask for help. The student is encouraged to ask the drawing instructor for any suggestions to improve the drawing 15. The instructor determines the success of the drawing 15 through visual comparison with the simplified china marker image 9.
18. Ghost your line. After receiving approval from the drawing instructor in Step 17, the student is encouraged to lighten all lines in drawing 15 before proceeding on to adding details in Step 19. This is done by lightly rubbing the drawing with a kneaded rubber erasure 17.
19. Add details. At this stage all traces of the basic shapes china marker drawing 9 is rubbed off plastic sleeve 4 with a soft cloth or paper towel 16. FIG. 15 demonstrates the next stage in this step. The isolating white paper 10 that was inserted under the grid inside plastic sleeve 4 is also removed as shown by arrow 47 in FIG. 15. This reveals the original image 45 to be copied with all its detail. The student is encouraged to refine all line movements in the big shapes already drawn and add all details that have been revealed on the original image 45. The conclusion of this step can be observed in FIG. 16. Typically, by the end of this phase of the drawing process the original image 45 and the final drawn copy 48 look strikingly similar.
20. Ask for help one last time. The student is encouraged to ask the drawing instructor to check the final drawn copy 48 for accuracy against the original image 45 after all details have been added. Success at this final stage of the drawing process is determined by how precisely the final drawn copy 48 visually resembles the original image 45.

At the bottom of the list of twenty drawing steps 49 that appear in FIG. 17 a reminder 50 to the student is printed. It reads:

Remember: Always work from large to small.

This helps focus the student throughout the drawing process. When starting a drawing, a student is instructed to begin with big shapes first because it forces the student to consider the major components driving the composition before attending to smaller, supporting shapes. Throughout the drawing, reminder 50 helps keep the student attentive to the large, structural movements that comprise the image. It also alleviates a pitfall that can occur when drawing with grids: quite often, when grids are enlisted to assist drawing, novice draughtsman commence work in a piecemeal fashion, often finishing one rectangular grid area at a time in all its detail before moving on to another area that may or may not adjoin it. Reminder 50 instills in a student an appreciation of the wholeness of the image, which ensures a method of drawing where large, major line movements are seen to consciously flow from one rectangular grid area to the next, thus forcing a student to find connections across grid lines, as opposed to perceiving them as boundaries. At the conclusion of the drawing process, reminder 50 also helps guarantee that details are being placed in relation to larger shapes to assure a faithful reproduction of the original image.

Vital procedures such as turning the image upside down help to separate the student's assumptions and memory of what the picture is an image of and what the shapes that comprise that image actually look like. The image takes on the appearance of an arrangement of flat abstract shapes instead of a specific object or identifiable picture. Gridlines 6 function as measuring points for the student, and also serve to create shapes to compare back and forth against, and are ideal as boundary lines for negative shapes. The student further understands the importance of the two-dimensional structure of the composition through identifying the negative shapes and using them to accurately place the drawing within the grid.

Once all basic shapes 9 have been satisfactorily replicated on drawing 15, the blank sheet of paper 10 is removed, revealing the original image 45 underneath, as depicted in FIG. 15. The student removes the basic shapes 9 drawn on plastic sleeve 4 in china marker 8 with a soft cloth or paper towel 16. The student is then ready to ghost all lines drawn in pencil on the gridded paper as described in Step 18 of the twenty-step drawing tips 18. This is done by rubbing a kneaded eraser 17 over the penciled basic shapes 15 drawn on the drawing paper 11. This step is important in that the drawn basic shapes 15 act as placeholders for the smaller shapes and details 48 within them. A lightly erased drawing makes it easier for the student to modify or embellish any of the drawn basic shapes 15 and add details to complete the drawn copy 48, as demonstrated in FIG. 16.

Upon the conclusion of Step 20 the drawn copy 48 is ready to be finished in the artist's medium in which the original image 45 was executed. A progression from drawings executed in pencil finished in the medium of pen and ink, to drawings executed in pencil finished as paintings in watercolor, to drawings executed in pencil finished as paintings in oils, are artist's mediums which further increase the effectiveness of the current apparatus. This progression neatly follows the development of Western Art, where the linear qualities of artists like Giotto (1267-1337) were supplanted by painters such as Monet (1840-1926), who created their masterpieces out of the harmonious relationship of related colored masses. It also follows the traditional stages of developing a creative concept, as exemplified by Rembrandt (1606-1669), who cultivate ideas by first drawing them in ink, then proceeded to refine them in washes, before committing them to a final concept in oil paint. By following this course of instruction a student advances from a basic understanding of line, defined in drawing as a mark of varying thickness made in pencil, pen, chalk, and the like, to define an outline or contour or shade an area, to conclude with an understanding of mass, defined in painting as a large area or form of one shade, color, intensity, etc. This progression also advances a student from working in black and white to color.

Figure 19:
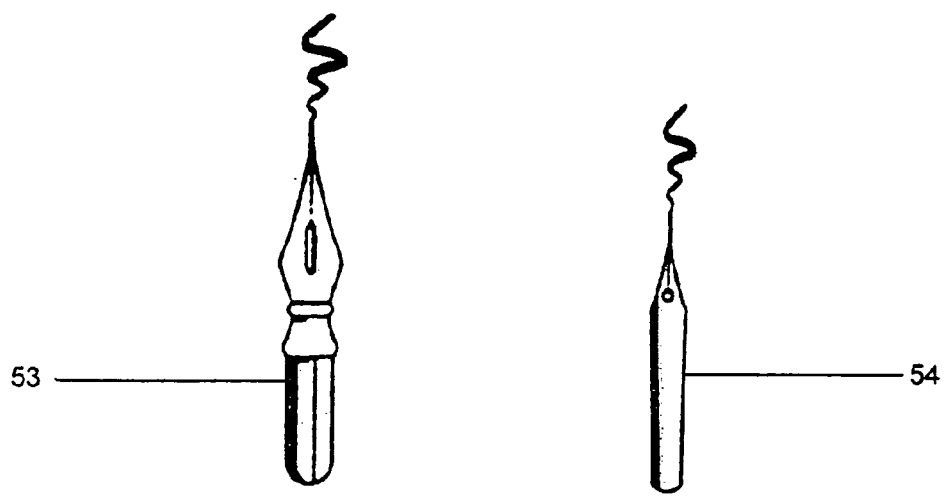
FIG. 19 is an illustration of two traditional pen nibs used to finish drawings in pen and ink.

FIG. 18 is a chart 19 entitled Inking Tips and aids a student on how to finish a drawing in pen and ink. This chart 19 refers to the use of traditional drawing pens that are dipped in drawing ink, as shown in FIG. 19. In the current method two pen nibs are employed, a large tip 53, used to create thicker lines and solid dark areas, and a small tip 54 superfine point used to create long, even lines and crosshatching.

Seven inking steps 51 and one reminder 52 are listed to assist the student. The steps are as follows:
1. Keep your pen tips clean.
2. Outline your shapes—use your thin pen tip.
3. Add line variety—use your thick pen tip.
4. Smooth out your line—use your thin pen tip.
5. Ask a teacher to check your picture.
6. Blow dry your picture.
7. Erase all your pencil lines.

Explanation of the seven pen and ink steps follow:
1. Keep your pen tips clean. Traditional drawing pens as pictured in FIG. 19 have a tendency to clog with ink or bits of debris. The student is encouraged to wipe the pen tips frequently with a cloth or paper towel when in use.
2. Outline your shapes—use your thin pen tip. The student is encouraged to outline completed drawn copy 48 using pen tip 54.
3. Add line variety—use your thick pen tip. The student is encouraged to use pen tip 53 to add accents on drawn copy 48 where they appear on the outlines of original image 45.
4. Smooth out your line—use your thin pen tip. The student is encouraged to use pen tip 54 to smooth out any line inconsistencies that occur between original image 45 and drawn copy 48.
5. Ask a teacher to check your picture. The student is encouraged to ask the instructor to compare now inked version of drawn copy 48 with original image 45 for accuracy of line variation and smoothness.
6. Blow dry your picture. The student is encouraged to use a standard hair dryer to blow dry inked version of drawn copy 48.
7. Erase all your pencil lines. The student is encouraged to get rid of all pencil lines that still remain on inked version of drawn copy 48 by rubbing gridded drawing paper 11 with kneaded eraser 17. This removes all traces of pencil lines from gridded drawing paper 11, including the gridlines themselves. At the conclusion of this stage the student typically has a finished picture that precisely resembles the original image being copied.

At the bottom of the list of seven inking steps 51 that appear in FIG. 19, a reminder 52 to the student is printed. It reads:

Find line variety by comparing three line thicknesses.

This reminder helps focus the student throughout the inking process. When starting a pen and ink, a student often has difficulty seeing the relative line widths of the original pen and ink image being copied. Reminder 52 helps direct that student to concentrate on comparing three line thicknesses within any given area, those line thicknesses being: 1. thick lines, 2. medium lines, and 3. thin lines.

Figure 20:
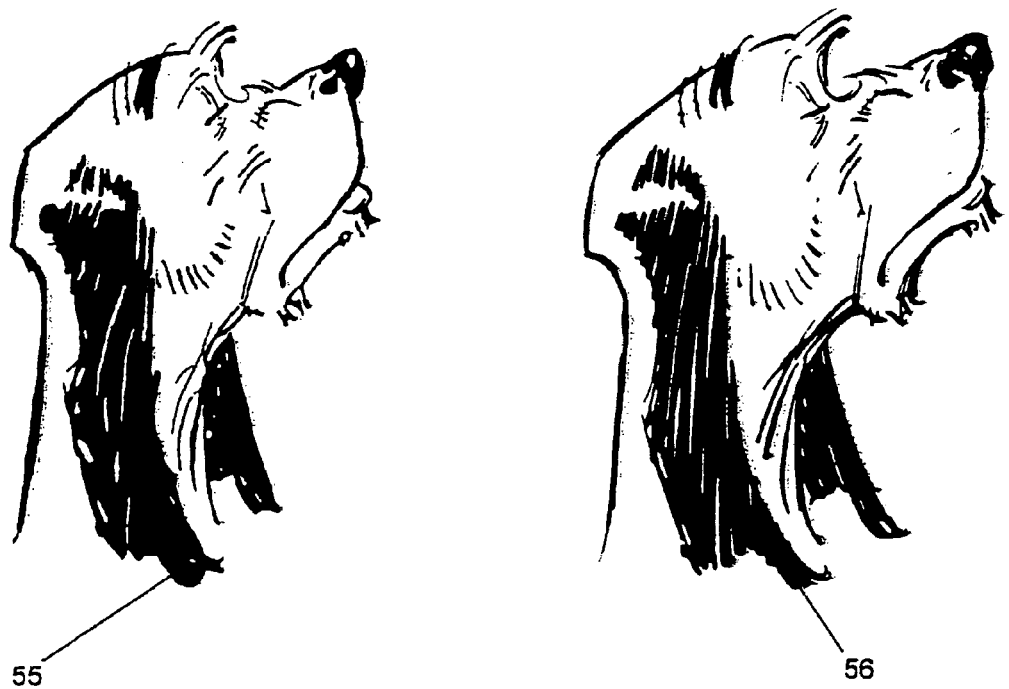
FIG. 20 is a reproduction of an example of a student's rendering of an image to the left of that original image, both executed in pen and ink.

FIG. 20 shows a young student's finished beginning pen and ink copy 55 of an original image 56, after using the current invention, including the graduated grid system utilizing grid 5, Drawing Tips 18 and Inking Tips 20. Note the similarity between the two images.

Figure 21:
FIG. 21 is a reproduction of an example of a student's rendering of an advanced inking exercise.

FIG. 21 shows another student's finished advanced pen and ink copy 57 utilizing the same apparatus and method, showing its adaptability to persons of different skill levels.

After completing one or more pen and ink copies a student is ready to complete drawings finished in watercolor. This transitions a student from working in black and white to color, and also introduces that student to the concept of mass.

Figure 22:
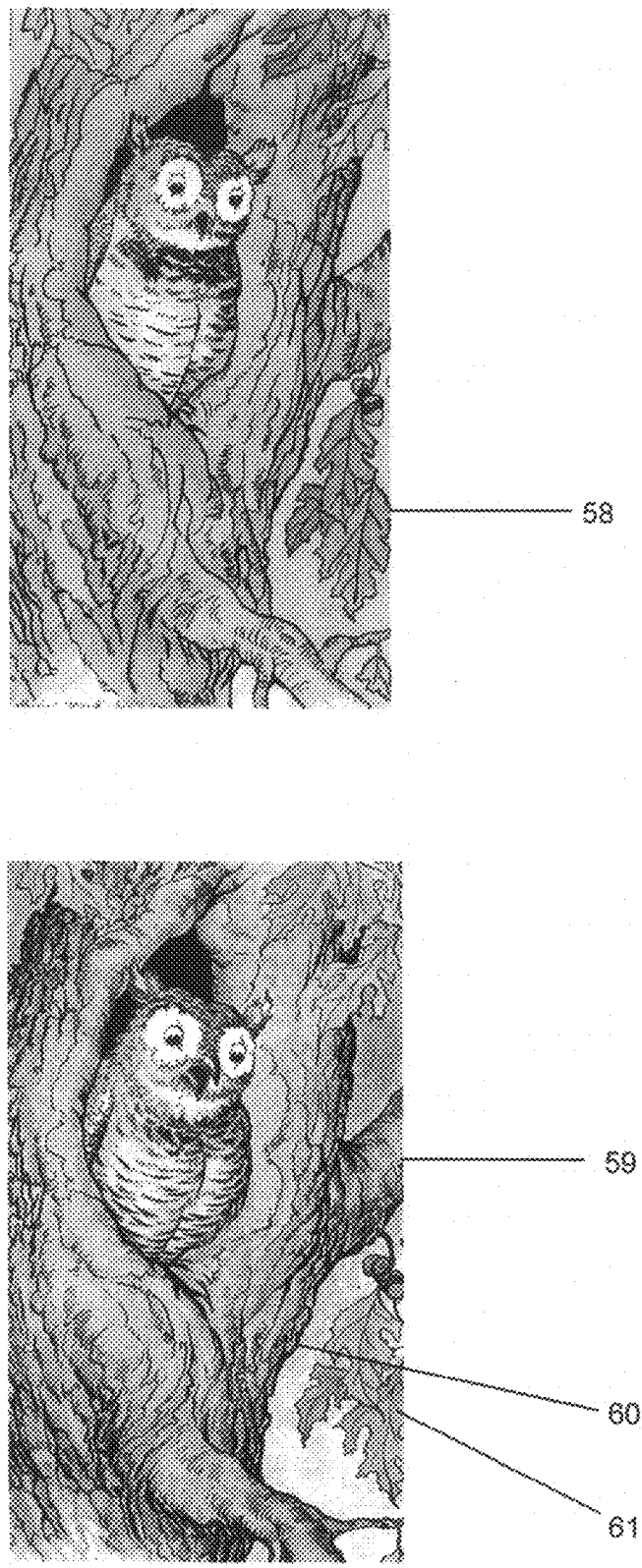
FIG. 22 is a painted example of a student's reproduction of an image above that original image, both executed in pen and ink and watercolor.

FIG. 22 shows a young student's finished watercolor copy 58 of an original watercolor image 59. Note that at this stage of a student's training all color masses are contained by pen and ink lines 60, which would be finished prior to painting, thus allowing the student to move easily into watercolor. Areas of flat watercolor washes 61, appearing within their ink boundaries, are colors mixed and applied by the student during the painting process. Washes are kept flat at this level of skill development to teach brush handling, color mixing and value perception.

After a drawing that is to be finished in watercolor is inked, following inking steps 51 and reminder 52 listed in chart 19, the drawing is ready for paint application. The current method employs traditional watercolor painting materials in its setup: two watercolor brushes, one being a small round-haired brush and the other being a large flat-haired brush, a mixing tray, 2 small jars of water, paper toweling, and watercolor paint. Beginning painters are limited to four colors when finishing their first paintings. The colors used are the three primary colors, yellow, red, blue, and one neutral color, black.

FIG. 23 shows a chart 20 entitled Color Mixing Tips used to aid a student in color mixing. Eight color mixing steps 62 are listed to assist the student. The steps are as follows:
1. Hold your brush back.
2. Transfer enough water into your mixing tray.
3. Boldly add pigment.
4. Stir your color.
5. Test your color along the edge of the paper.
6. Ask yourself: Is it too light, too dark, or just right!
7. To lighten a color—add water
   To darken a color—add pigment
   To dull a color—add black
8. Ask a teacher to check your color Explanation of the eight color mixing steps follow:
1. Hold your brush back. The student is encouraged to hold a watercolor brush toward the end of its handle, and not like a pencil. This facilitates expressive color mixing and paint handling.
2. Transfer enough water into your mixing tray. The student is encouraged to use the watercolor brush to transport water from one of two water jars into the mixing tray. The amount of water transported should be enough to complete the area that has been chosen to be painted.
3. Boldly add pigment. The student is encouraged to use a watercolor brush to add pigments into the transported pool of water to create the new color being mixed.
4. Stir your color. The student is encouraged to use a watercolor brush to stir the pigments transferred into the pool of water so those pigments mix together to form the one new color.
5. Test your color along the edge of the paper. The student is encouraged to test the new color that has been mixed on an edge of watercolor paper. This is done because watercolor dries lighter than it appears in a mixing tray, so its accurate color and value cannot be assured until it has been sampled on that paper. To make this step easier, small strips of watercolor paper are cut and distributed to the student for this purpose. In the current system they are referred to as 'test strips'.
6. Ask yourself: Is it too light, too dark, or just right! The student is encouraged to compare the color that has been mixed and painted on the test strip with the color on the original image that is being matched. As the mixed color is assessed for accuracy, the student asks if it is too light, too dark, or just right when comparing it to the original color.
7. To lighten a color—add water. To darken a color—add pigment. To dull a color—add black. The student is encouraged to adjust the mixed color to make it more accurate if it is not correct. If the color is too dark, more water is added; if the color is too light, more pigment is added; if the color is too bright, a touch of black is added.
8. Ask a teacher to check your color. Once the color has been mixed to the satisfaction of the student, the student is encouraged to ask an instructor to check the color for correctness. After the instructor has approved the mixed color, it is ready to be painted onto the copied drawing.

FIG. 24 shows a chart 21 entitled Watercolor Tips used to aid a student in watercolor painting. Nine watercolor steps 63 are listed to assist the student. The steps are as follows:
1. Work wet.
2. Always stir your color.
3. Always work from top to bottom.
4. Keep your paper at a 30 degree angle.
5. Overlap each stroke by ½.
6. Keep all of your wash moving down together.
7. Don't stop until your wash is finished.
8. Soak up any extra paint.
9. Always work from: Light to dark
   Large to small Explanation of the nine watercolor steps follow:
1. Work wet. When preparing to paint, the student is encouraged to work with a brush fully loaded with the color mixed. By painting wet, watercolor washes are less apt to become streaky.
2. Always stir your color. As watercolor sits in a mixing tray, mixed pigments have a tendency to separate. The student is encouraged to use a watercolor brush to stir the mixture to insure that a uniform color is used when painting.
3. Always work from top to bottom. The student is encouraged to paint from the top down when painting.
4. Keep your paper at a 30 degree angle. The student is encouraged to angle the watercolor paper at a 30 degree angle to the horizontal table upon which the paper is placed. For larger paintings, it is traditional in watercolor painting to mount the paper on board with tacks or tape. If this is the case, the board may be propped to the proper angle with a stack of books or some other support. By maintaining a 30 degree angle, gravity is allowed to assist the student in keeping the wash uniform, in that extra pigment flows to the bottom of each brush stroke and pools there.
5. Overlap each stroke by ½. The student is encouraged to paint the flat wash in straight horizontal strokes. At the completion of each horizontal stroke, working from top to bottom as stated in Step 3, the student initiates a new horizontal stoke which overlaps the previous stroke by ½. This insures that the pooled pigment that is the result of Step 4 keeps moving down uniformly. This is yet another way to insure that flat areas of wash do not become streaky.
6. Keep all of your wash moving down together. The student is encouraged to keep all horizontal strokes moving down the picture consistent and uniform as they advance at the same pace.
7. Don't stop until your wash is finished. The student is encouraged to keep working until all areas of the wash being painted are filled in.
8. Soak up any extra paint. When the area to be painted is completely covered with paint a bead of color will pool at the bottom of the wash. The student is encouraged to soak up any remaining paint with the tip of a watercolor brush.
9. Always work from: Light to dark; Large to small. When choosing which areas to paint first on a painting, the student is encouraged to paint the lightest, largest areas first.

Figure 25:
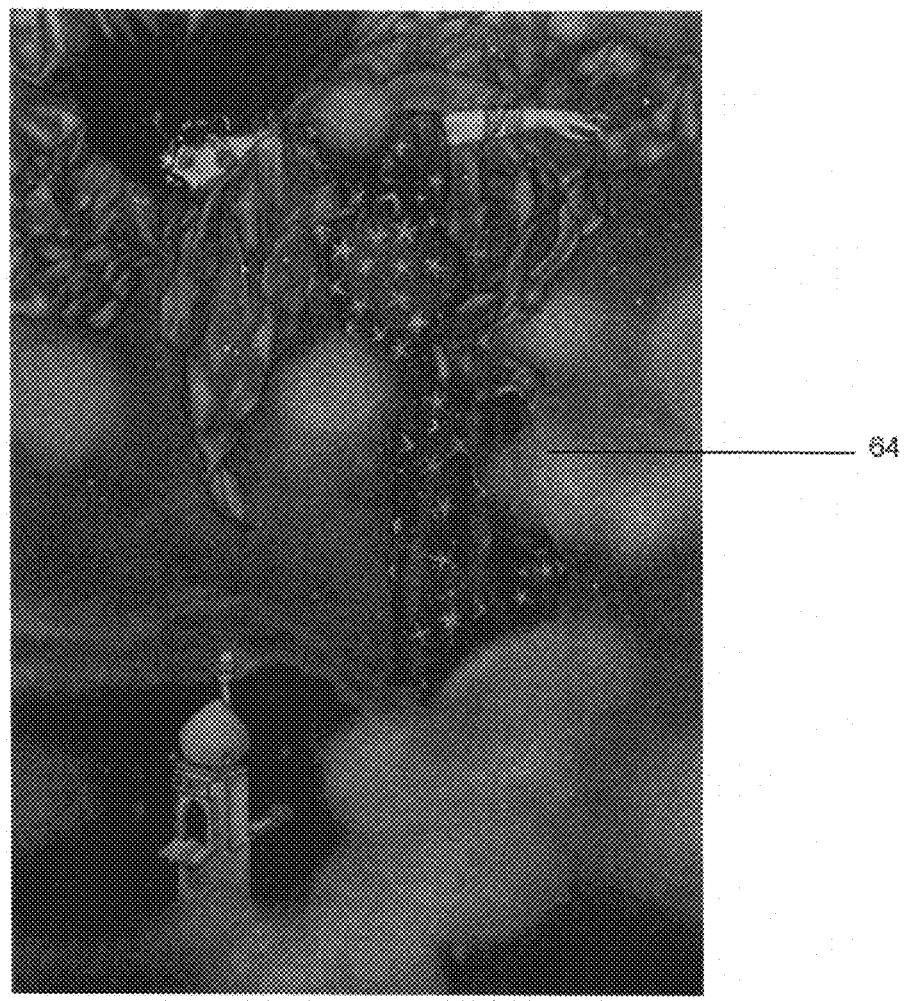
FIG. 25 is a reproduction of an example of a student's rendering of an advanced watercolor exercise.

Upon the completion of several watercolor copies, as pictured in the top portion 58 of FIG. 22, a student is ready to proceed to advanced watercolor painting. Copies created at this level of skill development are less dependent on boundaries defined by ink lines. In addition, watercolor washes are applied in a freer, more experimental manner. All materials and methods remain essentially the same, except for an expanded color range. Students are now allowed to use primary and secondary colors, those being yellow, red, blue, orange, purple, and green, plus two neutral tones, black and brown. FIG. 25 is an example of an advanced watercolor painting using these colors, completed by a student, age 15. Notice how color areas 64 are no longer defined by thick black ink lines, giving the picture a richer, atmospheric quality. Students who have reached this stage of technical proficiency are ready to advance to finishing drawings in oil paint. It is in oil painting that students using the graduated grid system gain a full understanding of brush handling, color mixing and value perception. FIGS. 26 through 32 illustrate devices and methods used to insure a successful result when painting in oils.

Figure 26:
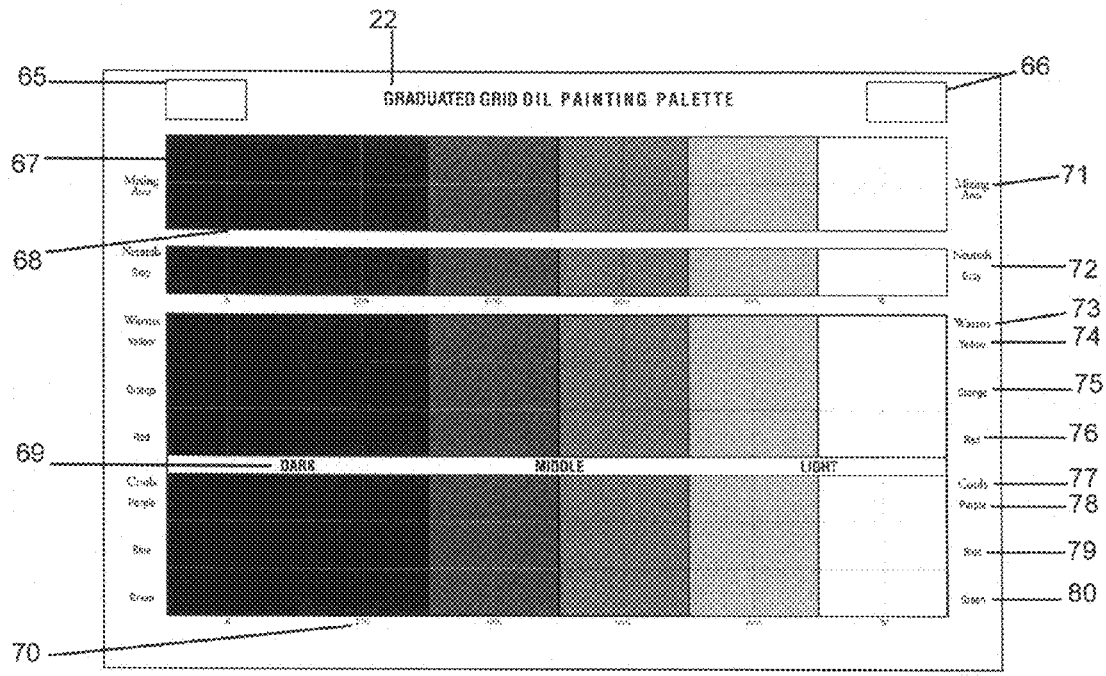
FIG. 26 is an illustration of a graduated grid oil painting palette used in the completion of drawings to be finished in oil paint.

FIG. 26 is a diagram of a graduated grid system oil painting palette 22. It is composed of a printed sheet of gloss white paper backed with rigid plastic or masonite, and covered with a sheet of tempered glass. Though created specifically for painting in oils, the palette may also be adapted to other artist's mediums, including acrylic and egg tempera paint.

Describing the palette by starting at the upper left-hand corner, a small rectangle 65 appears. This is the area on the palette where black paint is placed.

A second small rectangle 66 appears at the upper right-hand corner of the palette. This is the area on the palette where white paint is placed.

Below rectangles 65 and 66, long, narrow value strips 67, ranging in tone in six bands from dark to light, appear. These value strips 67 assist the student in judging the darkness or lightness of a color. All six bands have dividing lines 68 within them. These lines help a student place color upon a value strip 67 neatly. The bands that compose a value strip 67 are subdivided into groups and then classified with classifications 69: the two dark-valued bands are classified Dark, the two medium-valued bands are classified Middle, and the two light-valued bands are classified Light. Additional labels 70 indicate to the student what percentage of light, ranging from black (0% light), to white (100% light), is represented within each band. Such labeling insures that a student understands color values and their relationship to the direction of light that is represented within a painting.

Moving down the palette 22, all value strips 67 are grouped into four categories. These are labeled and identified on both left and right margins.

The first category consists of two value strips, stacked and labeled Mixing Area 71. This is the area on the palette where a student mixes paint.

The second category consists of a single value strip, labeled Neutrals Gray 72. This is the area on the palette where neutral-gray paints are arranged from dark to light.

The third category consists of three value strips, stacked and labeled Warms 73. Within this grouping each strip is further identified. The first strip is identified Yellow 74. The second strip is identified Orange 75. The third strip is identified Red 76. This is the area on the palette where warm-colored paints are arranged from dark to light.

The fourth category consists of three value strips, stacked and labeled Cools 77. Within this grouping each strip is further identified. The first strip is identified Purple 78. The second strip is identified Blue 79. The third strip is identified Green 80. This is the area on the palette where cool-colored paints are arranged from dark to light.

Figure 27:
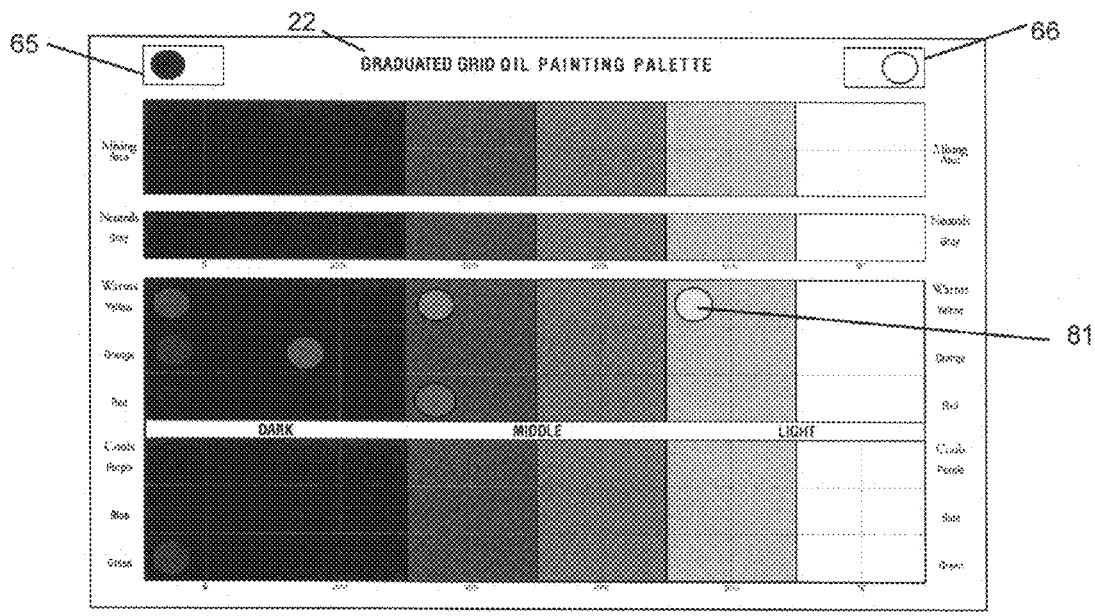
FIG. 27 is an illustration similar to FIG. 26, except showing the suggested placement of tubed oil colors on the gridded palette, while further demonstrating the position of colors used by a student at an advanced level of oil painting.
Figure 28:
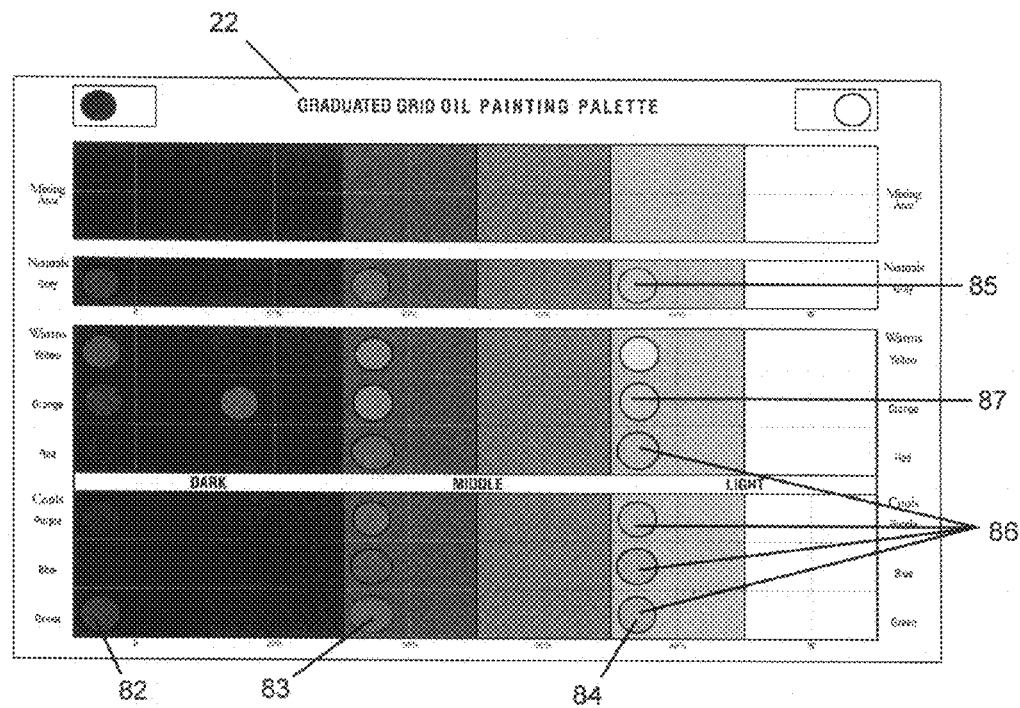
FIG. 28 is an illustration similar to FIG. 27, except showing the suggested position of colors used by a student at an intermediate level of oil painting.
Figure 29:
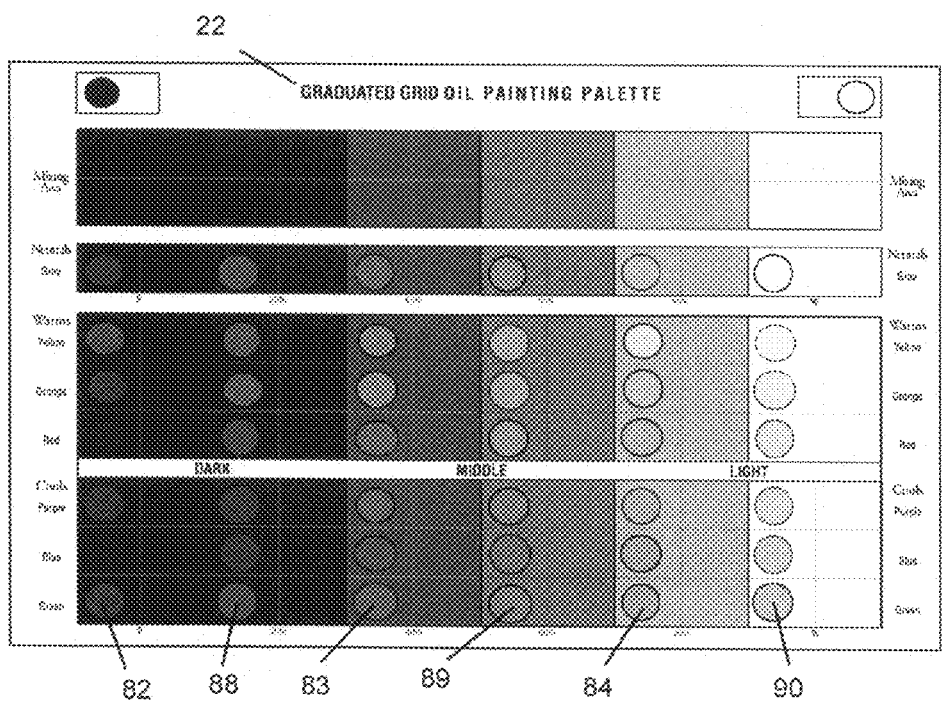
FIG. 29 is a final illustration similar to FIG. 28, except showing the suggested position of colors used by a student at a beginning level of oil painting.

FIGS. 27 to 29 illustrate the logic of this system. In FIG. 27, manufactured tubed oil paints are placed according to their darkness and lightness along each color-appropriate value strip. For purposes of explanation a simplified palette of manufactured oil paints follows. These are produced by Gamblin Artists Colors Co., of Portland, Oreg.:

Titanium White (white)
Ivory Black (black)
Raw Umber (dark yellow)
Yellow Ochre (medium yellow)
Cadmium Yellow Light (light yellow)
Transparent Earth Orange (dark orange)
Venetian Red (medium dark orange)
Alizarin Permanent (dark red)
Cadmium Red Light (medium red)
Ultramarine Blue (dark blue)
Viridian (dark green)

As purchased in the tube, these oil paints represent pure color at various points on a value scale.

Palette 22 in FIG. 27 shows the precise placement of these colors. First, ivory black and titanium white are placed in their appropriate spaces, represented respectively by box 65 and box 66. The remaining paints are then positioned, beginning with cadmium yellow light 81. These colors denote pure color choices at different value steps available to a student for mixing.

Palette 22 in FIG. 28 shows that more pure color choices have become available to the student through color mixing. For example, viridian green 82, initially placed in the dark green value band, has been lightened to a medium-valued green 83, by mixing some viridian green 82 with the titanium white placed in box 66. A light-valued green 84 is achieved by mixing more of the titanium white, placed in box 66, with a portion of medium-valued green 83. Neutral grays 85 are produced in a similar manner, intermixing a portion of ivory black taken from box 65 with increasingly more titanium white taken from box 66. Reds, purples, blues, along with the aforementioned greens 86 are all handled in a like manner, a dark-valued purple being first acquired by combining an equal portion of dark red alizarin permanent with dark blue ultramarine blue and then lightening that combination with titanium white. Oranges 87 are the exception to this rule. They are produced by intermixing like values of yellow and red.

Palette 22 in FIG. 29 concludes this sequence in color mixing, showing the maximum number of pure color choices available to the student through color mixing. Green is again used as an example. Dark-valued viridian green 82, is intermixed with medium-valued green 83, to produce intermediate dark-valued green 88. Medium-valued green 83 is intermixed with light-valued green 84, to produce intermediate medium-valued green 89. The lightest valued green 90 is achieved by lightening a small portion of light-valued green 84 with a much larger portion of titanium white, taken from box 66. All bands on all value strips for all colors, including neutral gray, are completed in this manner.

After a drawing that is to be finished in oil paint has been satisfactorily drawn, it is transferred to a stretched canvas or canvas panel using artists' transfer paper, as is typically done by artists today. The student then mixes up values of pure oil paint following the method just described, using a traditional oil painting palette knife to facilitate such mixing. The end result of this mixing process for a beginning oil painting student resembles palette 22 in FIG. 29.

It must be stated that as drawing grids graduate from one level to the next as a student becomes more proficient, oil painting palettes do the same. While a student beginning to paint in oils would mix all colors and values as in FIG. 29, an intermediate painter working with palette 22, would have colors placed as in FIG. 28. An advanced painter would use palette 22 with colors placed as it appears in FIG. 27. After this level of competence is reached, a painter has enough experience to successfully work with a traditional artist's wooden palette, thereafter have no need of the graduated grid oil painting palette whatsoever.

When learning to paint using the current method, other traditional oil painting materials are needed before painting commences. These include several artists' long-handled bristle and sable brushes of various shapes and sizes, a bottle of oil painting medium (a suitable medium is available from M. Graham & Co., of West Linn, Oreg., labeled Walnut Alkyd Medium. It is a solvent-free medium and suitable for use by children and adults), paper toweling, and two traditional artist's easels set side by side, one easel supporting the canvas to be painted, and the other easel supporting the original image being copied.

Figure 30:
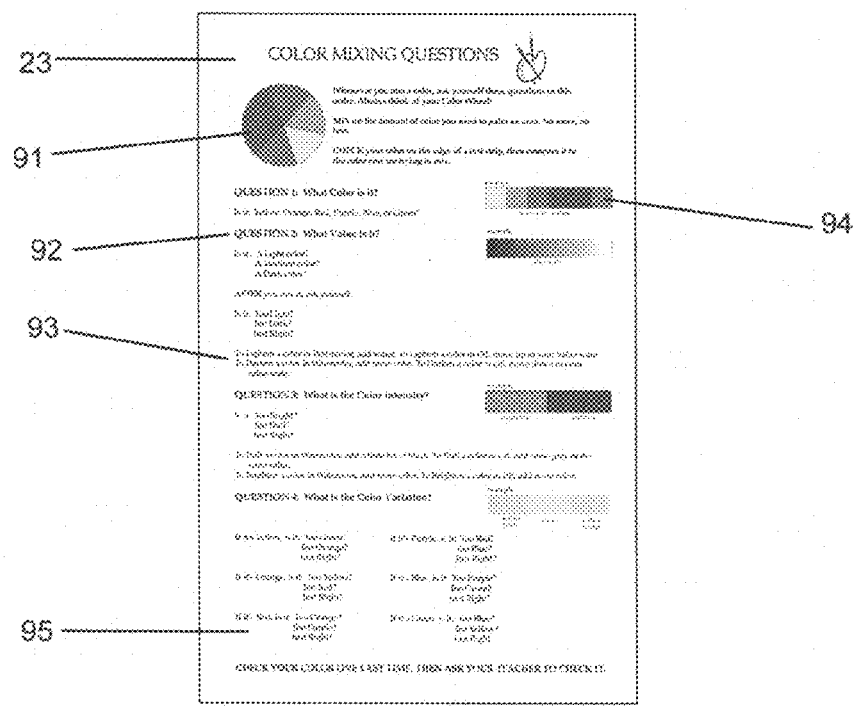
FIG. 30 is the front of a chart which clarifies a method of systematic color mixing in oil paint, while also elaborating on color mixing methods employed in watercolor painting.
Figure 31:
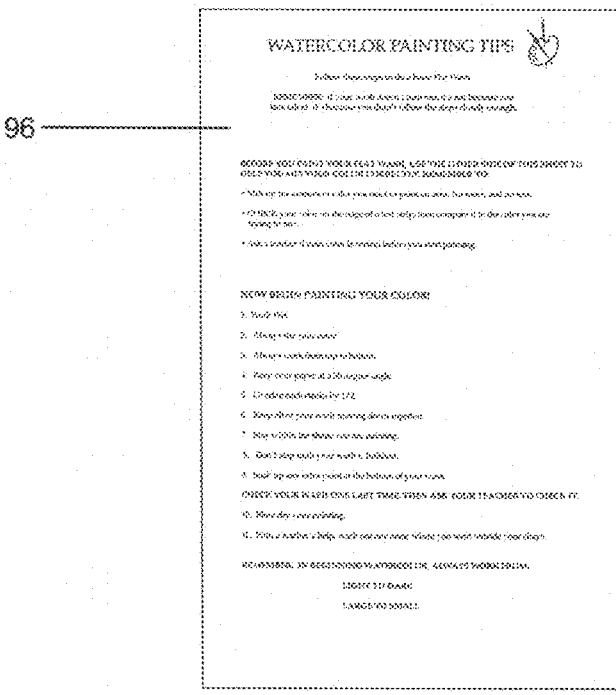
FIG. 31 is the back of the chart which appears in FIG. 30, which further clarifies a method of systematic watercolor painting.

After this set-up is complete, the student is ready to begin painting. The student proceeds by choosing a colored area on the original image being copied, usually beginning with a dark-value area, and then proceeds to match that color specifically. It should be noted that very few colors which appear in a painting are comprised of pure color, most being neutralized variations of those pure colors. To facilitate accurate and easy mixing of these colorful neutrals, FIG. 30 shows a chart 23 entitled Color Mixing Questions used to aid a student in mixing specific color mixtures that deviate from the pure color choices shown in FIG. 29. This chart also doubles as a mixing aid for students engaged in watercolor painting, as does the back of chart 23, shown as chart 96 in FIG. 31. (As watercolor painting has already been explained, it need not be referenced here further.) The chart begins with a reproduction of a typical artist's color wheel 91, and three related reminders:

Whenever you mix a color, ask yourself these questions in this order.
Always think of your color wheel!
MIX up the amount of color you need to paint an area. No more, no less.
CHECK your color on the edge of a test strip, then compare it to the color you are trying to match.

These three reminders codify the steps to facilitate successful and accurate mixing, starting with the importance of a color wheel as a useful reference tool, then progressing to a reminder to mix a reasonable amount of paint for the project at hand, and concluding with a cue to compare mixtures with the color area on the original image being matched.

Chart 23 continues with four color mixing questions 92 listed to assist the student. Answers to the questions 93 help navigate the student through the painting process. Examples 94 further illustrate questions 92. The four questions with accompanying explanations are as follows:

QUESTION 1: What color is it?
Is it: Yellow, Orange, Red, Purple, Blue, or Green?

This first question helps a student focus on determining the specific color that is being mixed to a reference on color wheel 91. In the current system of color mixing, there are no blacks, whites, grays or browns. Instead, all colors, even those that appear to be black, white, gray, or brown, are viewed as variations on pure primary and secondary colors. After the student has specified a color, the appropriate value strip on palette 22 is chosen that relates to that color. As noted in FIG. 26, these strips are labeled Yellow 74, Orange 75, Red 76, Purple 78, Blue 79, and Green 80. By judging color in this mariner, a student's eyes are trained in color sensitivity quickly.

QUESTION 2: What Value is it?
Is it: A Light color?
A Medium color?
A Dark color?
AFTER you mix it, ask yourself:
Is it: Too Light?
Too Dark?
Just Right?
To lighten a color in Oil, move up in your value scale.
To darken a color in Oil, move down in your value scale.

This second question and its related answers help the student position the color to be mixed on the chosen value strip according to lightness and darkness. The student consults the three categories 69 listed on palette 22. Through visual comparison, a position on the value scale for that color is chosen. If the student is a beginning painter, using palette 22, with colors arranged as in FIG. 29, a pure color will already exist in that chosen band of the value scale. If the painter is an intermediate or advanced painter, the pure color may have to be mixed. If this is the case, the color must be judged for accuracy against the color area that is being matched in the original image. This is done by asking: Is it too light, too dark, or just right? After these questions are answered, some adjustment to the color may be necessary. How this adjustment will be done is supplied in the Question 2 answers. In oil painting, a color is lightened by adding a lighter value of that same color on the value strip, while it is darkened by adding a darker shade of that same color on the value strip.

For example, an intermediate painter using palette 22 as it appears in FIG. 28 may be trying to mix a middle-value green, but green 83 appears too dark. A portion of green 83 would then be mixed with a portion of green 84 to create a lighter middle-value green 89, as seen in FIG. 29. If a lighter variation of the color does not exist for color mixing purposes, titanium white would be added. If a darker version of the color does not exist, ivory black would be added. By judging value in this manner, a student's eyes are trained to see color values accurately.

QUESTION 3: What is the Color Intensity?
Is it: Too Bright?
Too Dull?
Just Right?
To dull a color in Oil, add some gray of the same value.
To brighten a color in Oil, add more color.

By this point in the color mixing process, both the specific color and the value of that color have been determined. However, as very few colors within a painting are pure colors, as has been previously stated, most colors will need to have their color intensity adjusted. Question 3 asks the student to compare the color mixed on palette 22 with the colored area being matched on the original image being copied. The student asks: Is it too bright, too dull, or just right? After this question is answered, some adjustment may be necessary. How this adjustment will be done is supplied in the Question 3 answers. If the color on palette 22 is too bright when compared to the original color, it will be dulled with a neutral gray of the same value. If, in this dulling process, too much gray is added and the color becomes too neutral, it can be intensified with more pure color of the same value.

For example, an intermediate painter using palette 22 as it appears in FIG. 28 may be trying to mix a light-valued green 84. However, green 84 as it appears on palette 22 is too intense when compared to the colored area on the original image being copied. To rectify this problem, a portion of neutral gray 85, being of the same value as light-valued green 84, is mixed with a portion of green 84. If too much neutral gray 85 is accidentally added, color intensity is regained by mixing in more of light-valued green 84.

QUESTION 4: What is the Color Variation?
By now the color, value, and color intensity have been determined. However, the color may still be inaccurate when compared to the colored area on the original image being copied. This is because every color which appears on a color wheel has a cool or warm variation of that color. For example, yellow is a pure primary color, but few yellows, even after their value and intensity have been adjusted, are composed of primary yellow. They may, in fact be composed of yellow green, yellow's cool variation, or yellow orange, yellow's warm variation. It is at this point in the color mixing process that these considerations are addressed. FIG. 30 shows a series of six inquiries 95 within Question 4 which relate to the cool/warm variation of colors:

If it's Yellow, is it: Too Green?
    Too Orange?
    Just Right?
If it's Orange, is it: Too Yellow?
    Too Red ?
    Just Right?
If it's Red, is it: Too Orange?
    Too Purple?
    Just Right?
If it's Purple, is it: Too Red?
    Too Blue?
    Just Right?
If it's Blue, is it: Too Purple?
    Too Green?
    Just Right?
If it's Green, is it: Too Blue?
    Too Yellow?
    Just Right?

These inquiries direct the student back to color wheel 91 to find an answer to Question 4.

If, for example, an intermediate student, using palette 22 in FIG. 28, would be trying to mix a light-value red as appears in row 86, the student would inquire: Is it too orange, too purple, or just right? Let us suppose it would appear to be too purple when compared with the color area of the original image being copied. If that was the case, the solution would be to add a touch of color bordering red on its opposite side to purple. Thus, orange would be added to offset the purple undertone. If, to give another example, a green was found to be too yellow, blue would be added to offset the yellow undertone, and so on.

Figure 32:
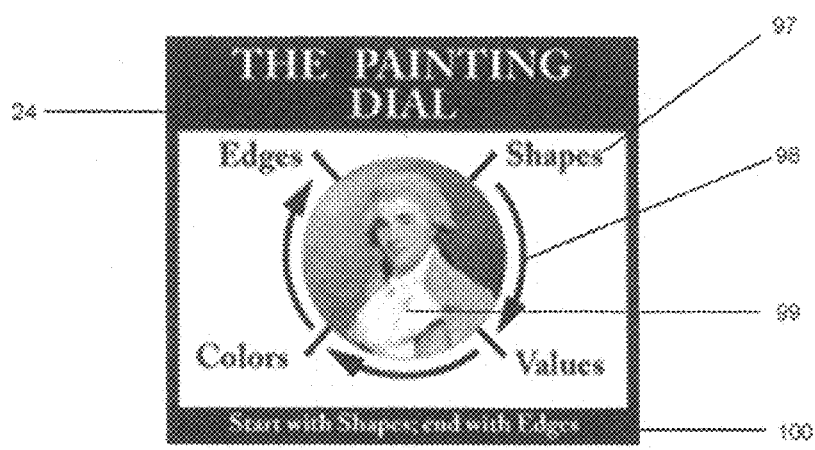
FIG. 32 is one of two dozen charts used to instruct a student in the successful completion of a drawing to be finished in oil paint.

By the time all 4 questions in chart 23 have been answered, a student will have arrived at the correct color to be mixed. After an instructor checks that color for accuracy, the student is ready to begin the actual oil painting process. FIG. 32 shows an example of one of two dozen charts used to guide the student at this point. The chart 24, entitled The Painting Dial, is an example of a directive on how a student should proceed.

The chart is divided into four parts. Words 97 connected by arrows 98 instruct the student on how to advance through the painting process. A central image 99, preferably a reproduction of a famous painting, is used to inspire the student. At the bottom of the chart 24, a reminder 100 is used to clarify all points. The chart 24 progresses through the following sequence:

Shapes to Values to Colors to Edges.

This progression is further emphasized in the reminder 100 at the bottom of the chart:

Start with Shapes; end with Edges

This directive and accompanying reminder 100 indicates to the student an orderly approach to oil painting. When working on any area of a painting, the first consideration should be accuracy in drawing, or shape. The second consideration should be accuracy of value, or the lightness or darkness of the thing being represented. The third consideration should be accuracy in color, as already determined with the aid of chart 23. The forth and final consideration should be accuracy in edge. This refers to the outline of the shape being painted. Rarely are shapes hard-edged. Therefore, the student is encouraged to soften the edges of shapes as much as possible.

Figure 33:
FIG. 33 is a reproduction of an example of a student's rendering of an oil painting completed by an advanced student.

FIG. 33 is a reproduction of an oil painting 101, completed by an advanced student following the current device and method. Its skillful execution clearly illustrates the success of this system. Notice how the area indicated by 101 is composed of soft edges. Much of the sense of the three-dimensional quality of this painting is derived from proper edge relationships.

When a student has reached the level of achievement indicated in painting 101, that student is ready to become free of the graduated grid system. They are prepared to draw independently of any grid device and paint freely, using a traditional artist's wooden palette. Color sensitivity has advanced to a point where neutral grays are no longer needed to dull colors. Instead, complementary colors, as defined as colors appearing directly opposite each other on a color wheel, may be combined to produce more vibrant neutrals. This student achieved such mastery after completing only six projects in the graduated grid system.

Figure 34:
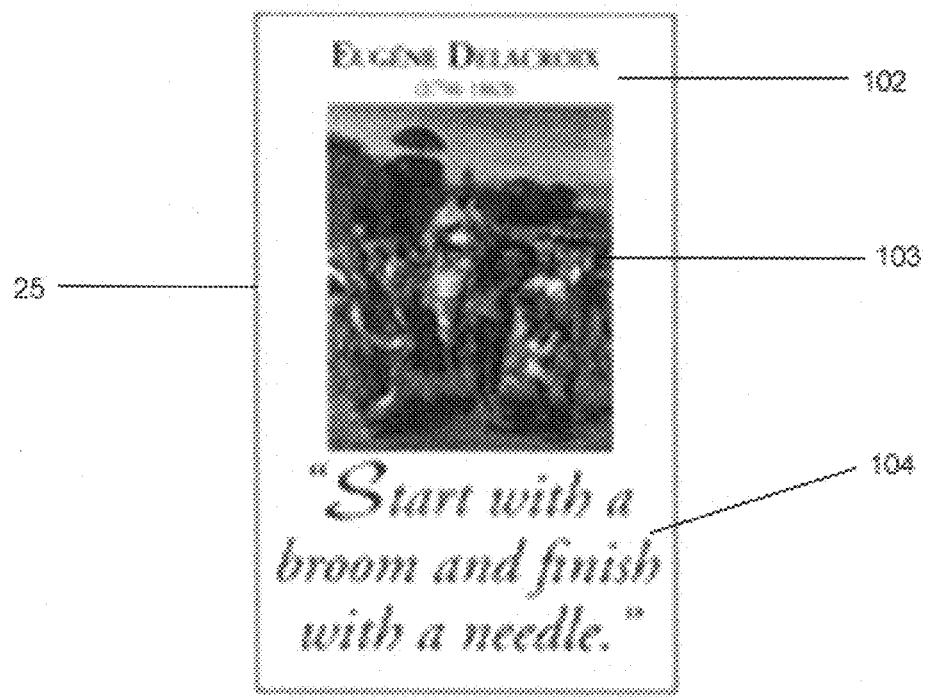
FIG. 34 is one of a hundred sequential charts used to further a student's understanding of drawing and painting through the use of art history.

When teaching painting some attention must be paid to encourage the advancement of an aesthetic within each student. FIG. 34 is one of a hundred sequential charts 25 used to further a student's understanding of drawing and painting through the use of art history. These charts are unique in that an image by an artist is accompanied by a quote by that same artist. At the top of each chart the artist's name and date of birth and death 102 appear. Below is a reproduction of one of the artist's masterpieces 103, followed by a pertinent quote 104. These quotes form a direct parallel to lessons learned when using the current apparatus. For example, Eugene Delacroix 102, who lived from 1796-1863, wrote in his journal: "Start with a broom and finish with a needle." 104. This phrase is a metaphoric restatement of reminder 50 that appears in chart 18 of FIG. 17:

Remember: Always work from large to small

These charts exert a subtle influence on young students, steering them toward a richer understanding of art history. It has been found that young students entering an arts program using the current device naturally develop an aesthetic that evolves from an attraction to cartoons, to an interest in animal or fantasy art, to an appreciation for fine art.

Figure 3:
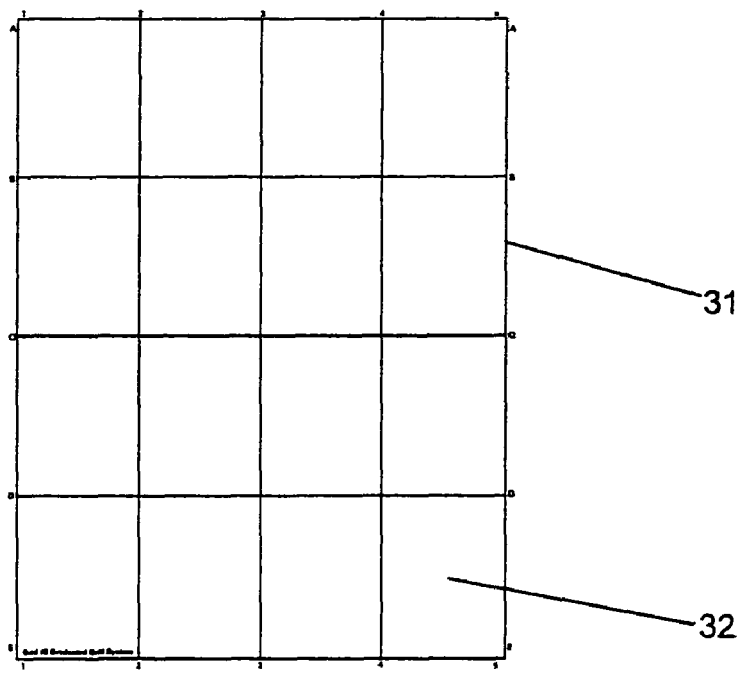
FIG. 3 is a diagram of the second grid used and comprised of sixteen equally-sized rectangles.
Figure 4:
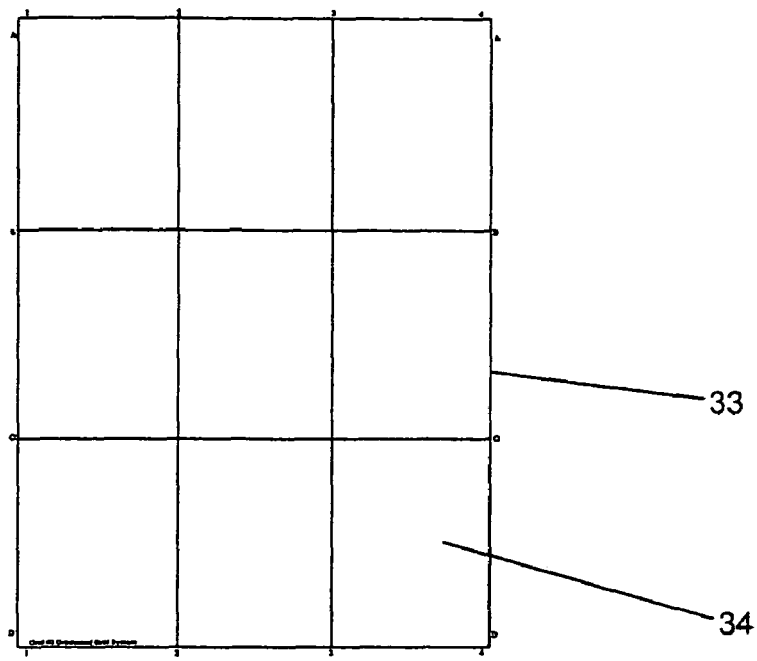
FIG. 4 is a diagram of the third grid used and comprised of nine equally-sized rectangles.
Figure 5:
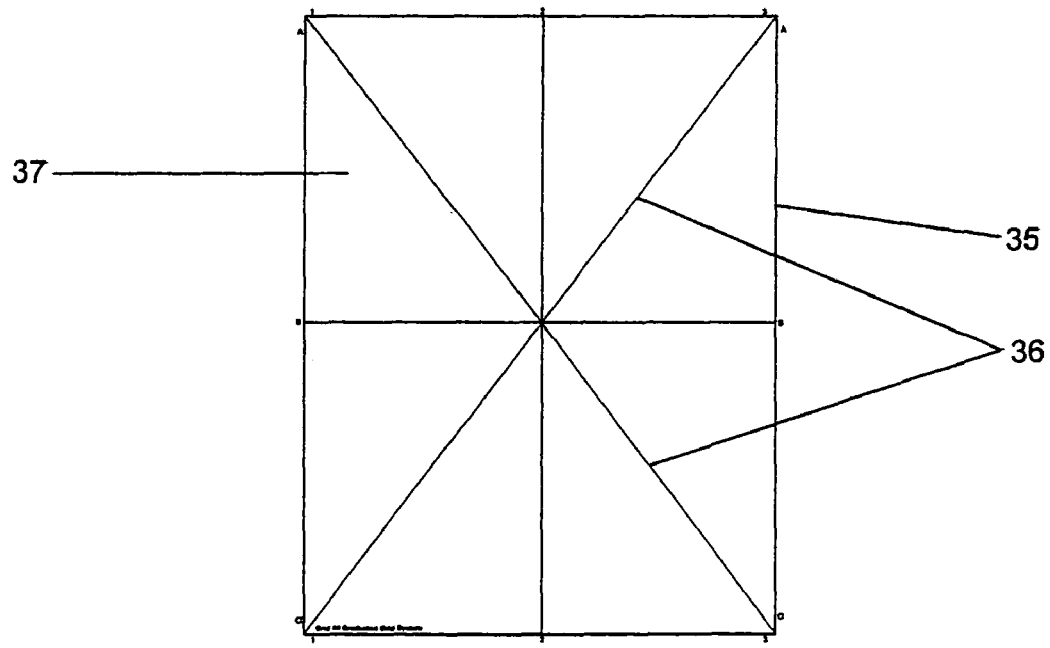
FIG. 5 is a diagram of the fourth grid used and comprised of four equally-sized rectangles, further divided by diagonal lines from corner to corner.
Figure 6:
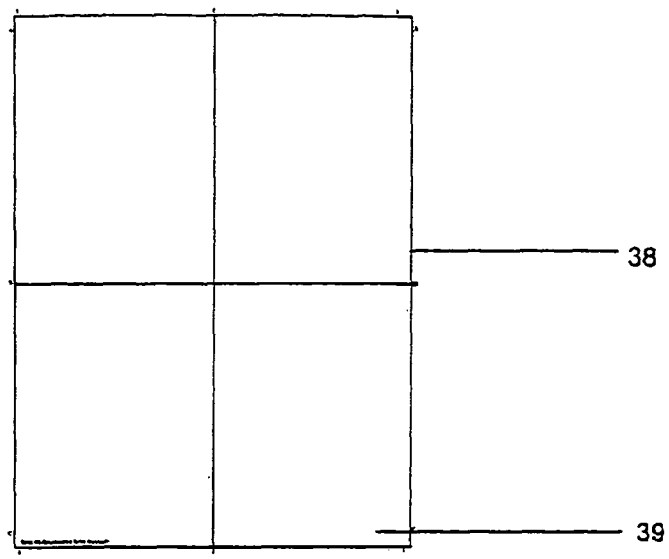
FIG. 6 is a diagram of the fifth grid used and comprised of four equally-sized rectangles.

Upon the completion of a successfully finished drawing or drawings using the current invention employing a grid composed of twenty-five rectangles as shown in FIG. 2, the student has acquired the necessary skills and knowledge to advance to the grid of sixteen rectangles in FIG. 3. As knowledge and abilities continue to increase the student works through finished drawings using a grid of nine rectangles as in FIG. 4, then a grid of four rectangles subdivided with diagonals as in FIG. 5, and concludes using the final grid of four rectangles as in FIG. 6. At the end of this grid cycle the student has become proficient enough to draw accurately without the use of any grid whatsoever, and has also become versed in a variety of artistic mediums, as has already been indicate in painting 101 of FIG. 33.

Continued testing has revealed alternate methods available to teachers and students using the current apparatus to insure successful progression in skill development and knowledge. Five variations are as follows:

Alternate Graduated Grid Method #1

Upon completion of one or more successfully finished drawings executed using a grid composed of twenty-five rectangles as in FIG. 2, the student does not advance to a grid of sixteen rectangles as in FIG. 3. Instead, said student advances in knowledge and ability by maintaining the use of the grid composed of twenty-five rectangles as shown in FIG. 2, but chooses to increase the complexity of images drawn with that grid. If this alternative method is used, basic shapes 15 are frequently broken down in successive layers due to the complexity of the images being copied. If this occurs, additional china markers 26 of various colors are employed to differentiate various degrees of simplification. By systematically increasing the complexity of images used within the grid the student is consistently challenged to improve artistic skills and knowledge and eventually becomes proficient enough to be independent of all apparatus.

Alternate Graduated Grid Method #2

Upon completion of one or more successfully finished drawings executed using a grid composed of twenty-five rectangles as in FIG. 2, the student does not advance to a grid of sixteen rectangles as in FIG. 3. Instead, said student advances in knowledge and ability by maintaining the use of the grid composed of twenty-five rectangles as shown in FIG. 2, but chooses to increase the size of the rectangles drawn onto the adjoining gridded paper 10. When using this alternate method it is important to keep all rectangles composing the enlarged drawn grid proportional to the twenty-five rectangles that comprise the transparent grid in FIG. 2 and shown in FIG. 1 as grid 5. The usual progression in the size of the rectangles drawn on paper 10 follows the pattern:

Level 1. The rectangles are the same size of the rectangles that appear in FIG. 2.
Level 2. The rectangles are double the size of the rectangles that appear in FIG. 2.
Level 3. The rectangles are triple the size of the rectangles that appear in FIG. 2.
Level 4. The rectangles are quadruple the size of the rectangles that appear in FIG. 2. And so on.

By systematically 'squaring up' the size of the original image that is being drawn on increasingly larger sheets of gridded paper similar to, but larger than, the paper that appears in FIG. 1 as 10, the student is again consistently challenged to improve artistic skills and knowledge and eventually becomes proficient enough to be independent of all apparatus.

Alternate Graduated Grid Method #3

Figure 35:
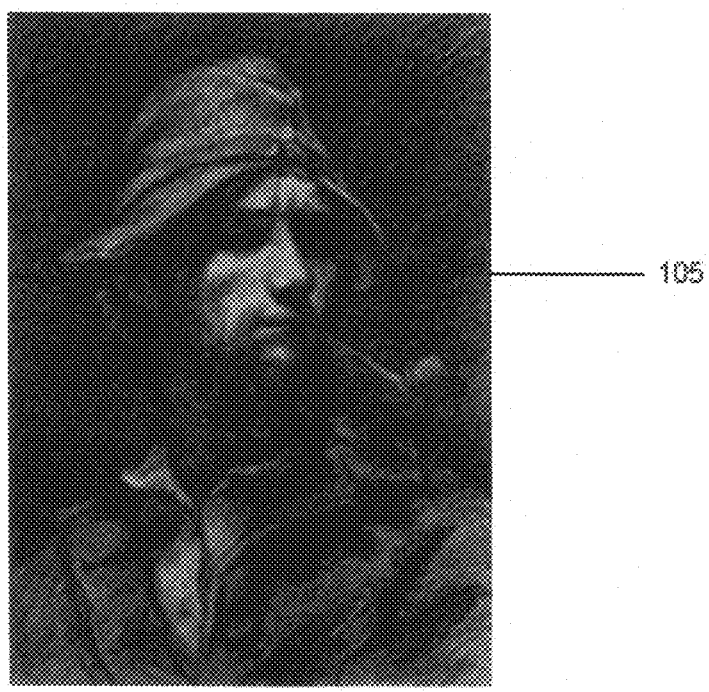
FIG. 35 is a reproduction of an example of a student's rendering of a charcoal drawing, illustrating an alternative method in using the graduated grid system as a teaching aid.

Upon completion of one or more successful drawings executed using a grid composed of twenty-five rectangles as in FIG. 2, and after having completed several successful drawings finished in pen and ink of varying complexity, as exemplified in FIGS. 20 and 21, the student does not advance to drawings finished in watercolor, but instead said student advances in knowledge and ability by following a progression of exercises focusing on the mastery of alternative mediums, with special emphasis placed on the development of a full understanding of tonal relationships and their correlation to light and form. Mediums especially suited to this method are charcoal, pencil, colored pencil, chalk, conte crayon and pastel. When following this progression of exercises, charts used to guide a student through the oil painting process, as shown in FIG. 32, are adapted to the needs of each individual medium and student. FIG. 35 shows one student's rendering of a charcoal drawing using the current invention utilizing grid 37, following this alternative method. By systematically increasing the difficulty of alternative mediums used to finish drawings developed within the graduated grid system, the student is consistently challenged to improve artistic skills and knowledge and eventually becomes proficient enough to be independent of all apparatus.

Alternate Graduated Grid Method #4

Similar to Alternative Grid Method #3, this variation intersperses exercises focusing on alternative mediums within the basic structure of the standard finishing mediums of pen and ink, watercolor and oil, thus providing a student with a complete understanding of the working properties of a wide variety of artist's tools. By systematically increasing the variety of alternative mediums used to finish drawings developed within the graduated grid system, the student also becomes proficient enough to be independent of all apparatus.

Alternate Graduated Grid Method #5

Figure 36:
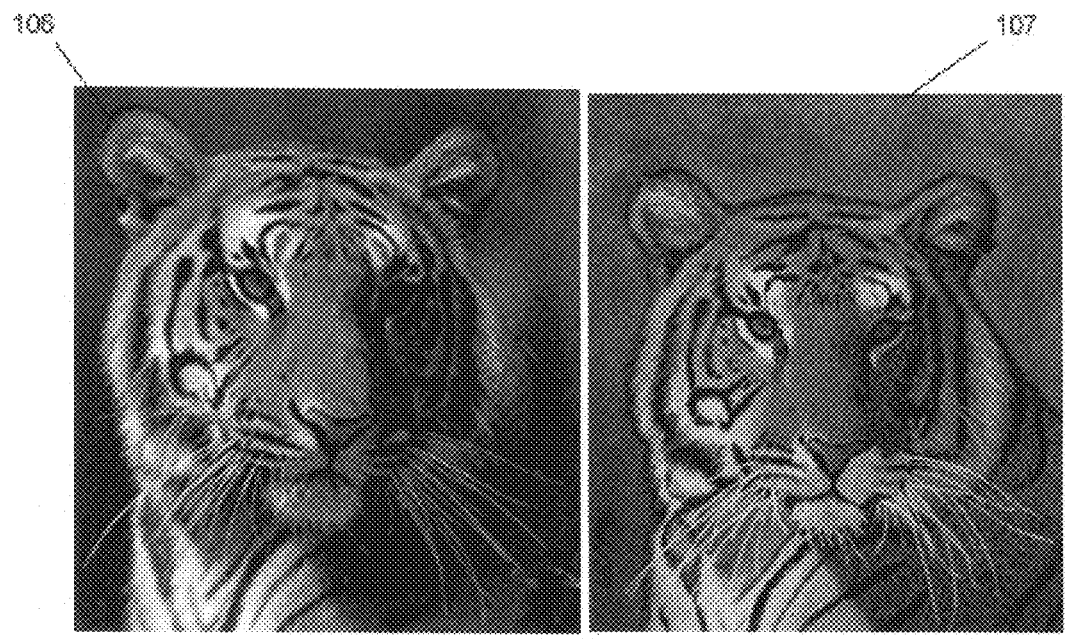
FIG. 36 is a photograph and a student's rendering in watercolor of that photograph, the student's rendering appearing on the right, illustrating another alternative method in using the graduated grid system as a teaching aid.

After having completed several successful drawings finished in pen and ink, watercolor, and/or oil, as exemplified in FIGS. 20, 21, 22, 25 and 33, and using the current apparatus, the student maintains the use of the graduated grid system for several more projects, learning how to apply the knowledge gained in previous exercises to the artistic interpretation of photographic images. FIG. 36 shows an example of this alternative method. A photograph 106 has been reproduced in watercolor 107 by a student, age 13, using the current invention utilizing grid 2. This alternative method is especially suited for students who have reached a level of proficiency and independence and who are trying to transition into pursuing art as a serious profession. Often, this method benefits from being used in combination with Alternative Graduated Grid Methods #1 through #4. When following this progression of exercises, charts used to guide a student through the oil painting process, as shown in FIG. 32, are adapted to the needs of each individual medium, student, and project. By placing emphasis on the artistic interpretation of images, the student is consistently challenged to improve artistic skills and knowledge and eventually becomes proficient enough to be independent of all apparatus.

Figure 37:
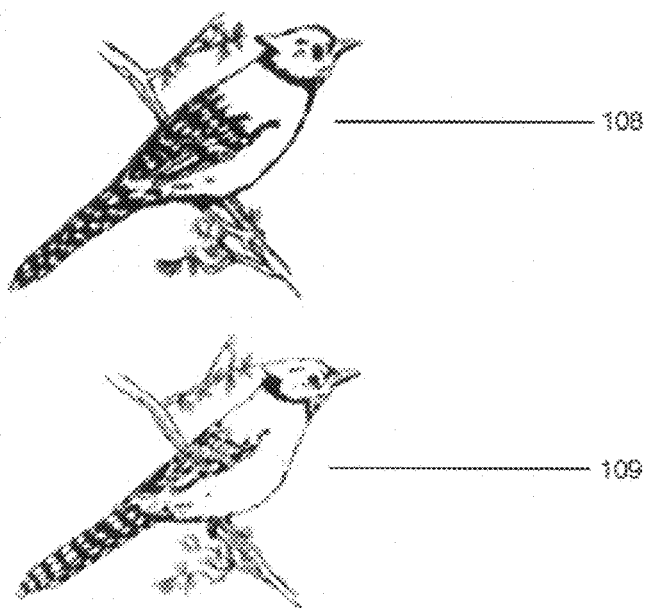
FIG. 37 is a reproduction of an example of two drawings by two separate students who have copied the same image, used to clarify a definition of 'success' when applying the grid system.

These examples of five variations are just a few of the many alternatives of the apparatus, proving the flexibility and adaptability of the current invention to the specific needs of individual art students and artists. All variations, however, as well as the typical progression of grids and methods earlier stated, depend on each project being taken to a point of 'successful' conclusion. Thus, a clear and reasonable definition of 'success', in respect to the current device and its methods, must be included in this description, as the achievement of the invention is dependent upon it. 'Success', then, in regards to the graduated grid system, is determined by how a drawing, finished in an appropriate artist's medium, most visually resembles the original image from which it has been copied. Ideally, complete accuracy is the goal, however, individual skill levels must be taken into account when determining that accuracy. FIG. 37 shows two drawings, 108 and 109, both finished in pen and ink, and completed by two different students of the same original image, which illustrates this very point. Both drawings would be deemed a 'success', and each student would advance to a higher level within the grid system, even though variances between the two are easily seen. These differences are most often due to a lack of experience rather than to a lack of ability, but each are well done and fall within the narrow range of acceptability that would qualify them as a 'success'. Thus, when assessments of accuracy are made by a student or an instructor, individual skill levels must be taken into account and factored into the decision determining that 'success'.

If a student has not been successful by making a skilled duplication of an original image, a grid level is repeated. This is best accomplished by repeating that grid level, but using a different image than the first one employed, the second image being comparable in complexity to the first image. By changing images but repeating grid levels the student retains interest in the drawing process and approaches the new drawing with a positive attitude, equating an experience that some would define by defeat, as simply a new challenge to excel.

Figure 38:
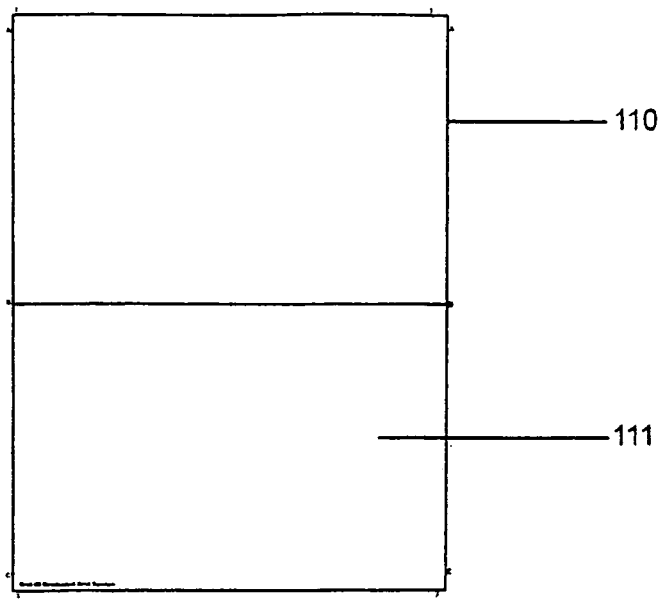
FIG. 38 is a diagram of two additional grids, one comprised of two equally-sized rectangles that are stacked on top of the other.
Figure 39:
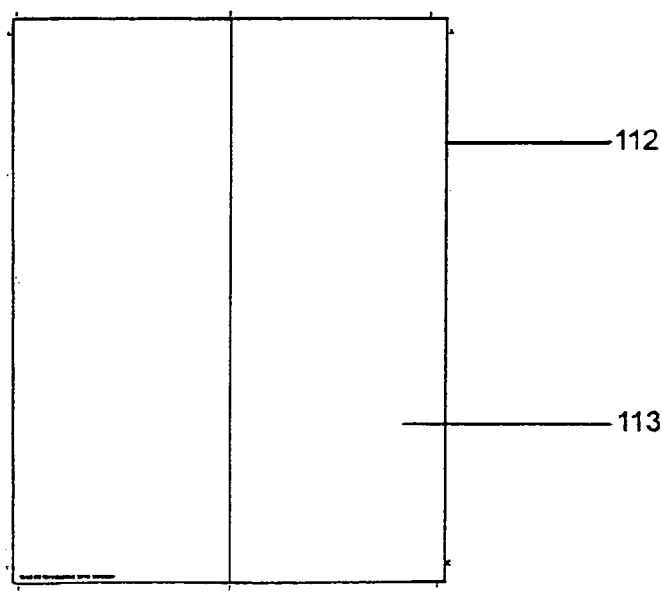
FIG. 39 is a diagram comprised of two equally-sized rectangles that appear side by side, each used to supplement the typical grid progression.

Often, a student who has used the current apparatus throughout all its various levels has a desire to work from nature. If this is the case, that student is encouraged to employ two other grids at the end of the typical grid progression. FIG. 38 shows the first of these additional grids, that grid 110 being composed of two equally-sized rectangles 111 that are stacked one on top of the other. This grid is especially useful for students interested in specializing in landscape painting, as it acquaints them with the habit of judging shapes off of a horizon line. FIG. 39 shows the second of these additional grids, the grid 112 being composed of two equally-sized rectangles 113 that appear side by side. This grid is especially useful for students interested in portrait painting, as it acquaints them with judging a person's features along the length of the head.

Figure 40:
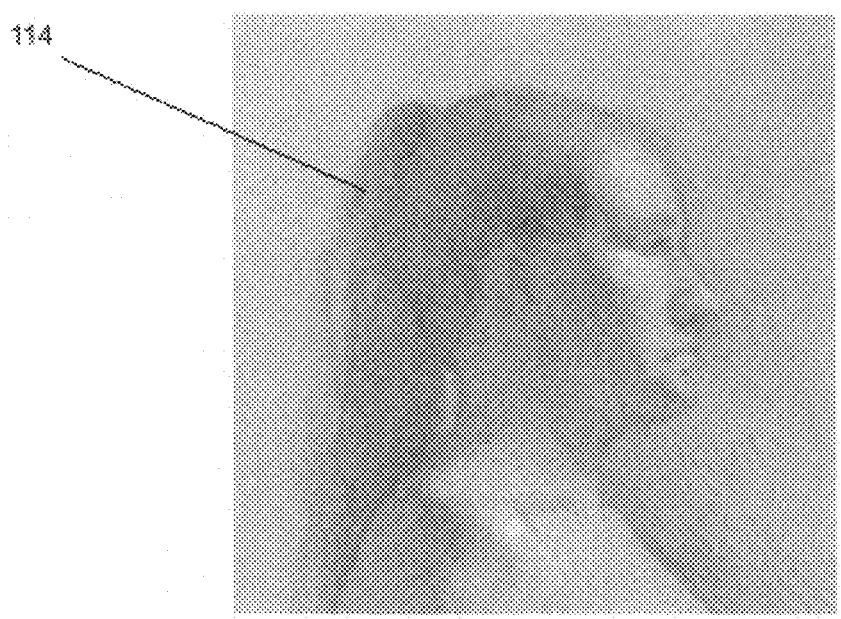
FIG. 40 is a reproduction of an example of the start of a drawing executed in conte crayon by an advanced student who has completed all steps of drawing and painting utilizing the graduated grid system, the drawing having been done freehand from a live model, without the use of any drawing tools whatsoever.

FIG. 40 is an example of the start of a drawing 114, executed in conte crayon, by an advanced student who has completed all steps of the drawing and painting process utilizing that grid system. This drawing 114, showing accuracy in shape and sensitivity in execution, was done freehand from a live model, without the use of any drawing tools whatsoever, illustrating the validity of the invention.

Thus, the preferred embodiment of apparatus and the method of using it have been described in detail. It must be understood, however, that the disclosure is exemplary and equivalents are possible. Therefore, in this regard, it is understood that changes made, especially in matters of shape, size, and arrangement to the full extent extended by the general meaning of the terms in which the appended claims are expressed, are within the principle of the invention.

The invention claimed is:

1. A method for optimizing the drawing and painting capabilities of a person said method comprising the steps of:
   setting up a graduated grid system for use by a person in drawing and painting reproduction, said graduated grid system comprising a flexible sleeve having an upper transparent surface and a lower surface formed with at least one opening along an edge of the sleeve; the opening formed by the surfaces being sized to enable placement and removal of the original image therethrough so that the original image is visible through the upper transparent surface; the opening formed by the surfaces further being sized to permit selective insertion and removal of a blank sheet of paper therethrough so that the blank sheet of paper may be positioned between the upper transparent surface and the original image; said upper transparent surface being durable and suitable for repeat cycles of use in which a user places and removes basic image shape lines on an outer surface of the upper transparent surface; a prepositioned grid arrangement placed on said flexible sleeve upper transparent surface; said grid arrangement being selectable from a variety of grid spacing options according to the ability of the user and the complexity of the original image whereby said image can be duplicated accurately by use of the shape and size of each of the transposed grid areas formed by said prepositioned grid arrangement on the plastic sleeve upper transparent surface; and a sheet for positioning and arranging material on which said image will be duplicated, said sheet removably attached substantially parallel to one side of said plastic sleeve and being suitable for drawing thereon by the user, said sheet having a prepositioned grid arrangement thereon which is identical in size and configuration to said prepositioned grid arrangement on said plastic sleeve upper transparent surface;
   inserting an original image in the plastic sleeve so that the user may view the image and then outlining the basic shapes of the largest dimensions of the image using a plurality of short straight lines placed, by grid area, onto the upper transparent surface outer surface and then advancing said drawing and painting reproduction made by said person by following a series of predetermined steps that help navigate said person to a successful conclusion, said predetermined steps comprising:
   a. inserting a blank sheet of paper into the plastic sleeve in a manner that conceals the original image from the person using this method;
   b. duplicating the basic shapes that were drawn on the upper transparent surface outer surface onto the attached sheet that is removably attached to the plastic sleeve;
   c. comparing, by grid area, the positive shape of the image being duplicated and the negative shape of the areas that surround the positive shape, to assess the accuracy of the duplication;
   d. correcting the duplication sequentially by grid area and thereby advancing said drawing and painting reproduction, includes the steps of:
      i. preparing said person for the demands of drawing through cycles of relaxation and concentration;
      ii. drawing all shapes lightly;
      iii. drawing big shapes before smaller shapes;
      iv. comparing back and forth between basic shapes outlined and basic shapes duplicated;
      v. turning the plastic sheet and attached sheet upside down to mitigate eye fatigue and to see proportions afresh;
      vi. placing small down arrows on the duplication at identified points of error;
      vii. ghosting in lines in a grid area prior to adding further details in that grid area; and
   e. partially and progressively withdrawing the blank sheet of paper from the plastic sleeve to reveal portions of the original image to be further outlined onto the upper transparent surface outer surface and then duplicated according to the above predetermined steps until the user of the method has successfully completed duplication of the original image.

2. The method of claim 1 wherein said graduated grid system is formatted to insure optimum results for all users regardless of initial ability, wherein the user is progressed from a predetermined grid arrangement having at least twenty five grid areas to predetermined grid arrangements having less than twenty five grid areas.

3. A method for optimizing the drawing and painting capabilities of a person, said method comprising the steps of:
   setting up a graduated grid system for use by a person in drawing and painting reproduction, said graduated grid system comprising a flexible sleeve having an upper transparent surface and a lower surface formed with at least one opening along an edge of the sleeve; the opening formed by the surfaces being sized to enable placement and removal of the original image therethrough so that the original image is visible through the upper transparent surface; the opening formed by the surfaces further being sized to permit selective insertion and removal of a blank sheet of paper therethrough so that the blank sheet of paper may be positioned between the upper transparent surface and the original image; said upper transparent surface being durable and suitable for repeat cycles of use in which a user places and removes basic image shape lines on an outer surface of the upper transparent surface; a prepositioned grid arrangement placed on said flexible sleeve upper transparent surface; said grid arrangement being selectable from a variety of grid spacing options according to the ability of the user and the complexity of the original image whereby said image can be duplicated accurately by use of the shape and size of each of the transposed grid areas formed by said prepositioned grid arrangement on the plastic sleeve upper transparent surface; and a sheet for positioning and arranging material on which said image will be duplicated, said sheet removably attached substantially parallel to one side of said plastic sleeve and being suitable for drawing thereon by the user, said sheet having a prepositioned grid arrangement thereon which is identical in size and configuration to said prepositioned grid arrangement on said plastic sleeve upper transparent surface;

inserting an original image in the plastic sleeve so that the user may view the image and then outlining the basic shapes of the largest dimensions of the image using a plurality of short straight lines placed, by grid area, onto the upper transparent surface outer surface and then advancing said drawing and painting reproduction made by said person by following a series of predetermined steps that help navigate said person to a successful conclusion, said predetermined steps comprising:

a. inserting a blank sheet of paper into the plastic sleeve in a manner that conceals the original image from the person using this method;

b. duplicating the basic shapes that were drawn on the upper transparent surface outer surface onto the attached sheet that is removably attached to the plastic sleeve;

c. comparing, by grid area, the positive shape of the image being duplicated and the negative shape of the areas that surround the positive shape, to assess the accuracy of the duplication;

d. correcting the duplication sequentially by grid area including the steps of:
   i. providing a pair of shape isolators each formed as a geometric shape having an outer circumferential dimension that is larger than any designated grid area formed by said prepositioned grid arrangement, and an inner dimension formed so as to create an opening sized to view a complete area of a designated grid area therethrough when said shape isolator is placed over the designated grid area, each of said isolators in a pair being identical for simultaneous use over said flexible sleeve upper transparent surface and said sheet suitable for drawing thereon by said user, wherein the material that forms each shape isolator between said outer circumferential dimension and said inner dimension is formed of material that blocks the view by the user of any underlying image;
   ii. using said pair of shape isolators for a designated area on the upper transparent surface outer surface and a corresponding area on the attached sheet having the duplication thereon, said pair of shape isolators being useful for enabling visual isolation and focus of the grid area being duplicated by the user of the method; and e. partially and progressively withdrawing the blank sheet of paper from the plastic sleeve to reveal portions of the original image to be further outlined onto the upper transparent surface outer surface and then duplicated according to the above predetermined steps until the user of the method has successfully completed duplication of the original image.

4. The method of claim 3 wherein said graduated grid system is formatted to insure optimum results for all users regardless of initial ability, wherein the user is progressed from a predetermined grid arrangement having at least twenty five grid areas to predetermined grid arrangements having less than twenty five grid areas.

5. The method of claim 3 further including the steps of:

a. providing a graduated grid oil painting palette, said palette having a printed sheet comprising a material that enables repeat cycles of paint to be used on a first surface of the sheet and then cleaned therefrom for re-use; said sheet having a pure black paint reference on a first corner and a pure white paint reference on an opposing corner; said sheet further having six value strips arranged horizontally to the user along the length of the sheet, with said value strips representing a mixing strip, a neutrals strip, a warm colors strip including yellow, orange and red, and a cool colors strip including purple, blue, and green; said value strips comprising a value scale with each strip progressing from a color tone with no white components at the left of the strip to a color tone with a high percentage of white components on the right of each strip; said sheet further having vertical dividing lines arranged to intersect the strips, said dividing lines facilitating groups of color tones referred to as dark, middle, and light; wherein the painting palette also has a predetermined amount of pure color choices marked as indicia along each of the six value strips, with a palette having more of said indicia being designed for use by less experienced users and a palette having relatively few of said indicia being designed for use by more experienced users;

b. ensuring that the graduated grid painting palette has a requisite number of pure color choices marked as indicia according to the ability of the user;

c. comparing the original image color that is to be duplicated by the user and determining where that color is located on the graduated grid palette; and d. determining whether it is necessary to lighten a pure color choice by moving up the value scale to the right of the sheet or whether it is necessary to darken a pure color choice by moving down the value scale to the left of the sheet.

6. A method for optimizing the drawing and painting capabilities of a person said method comprising the steps of:

setting up a graduated grid system for use by a person in drawing and painting reproduction, said graduated grid system comprising a flexible sleeve having an upper transparent surface and a lower surface formed with at least one opening along an edge of the sleeve; the opening formed by the surfaces being sized to enable placement and removal of the original image therethrough so that the original image is visible through the upper transparent surface; the opening formed by the surfaces further being sized to permit selective insertion and removal of a blank sheet of paper therethrough so that the blank sheet of paper may be positioned between the upper transparent surface and the original image; said upper transparent surface being durable and suitable for repeat cycles of use in which a user places and removes basic image shape lines on an outer surface of the upper transparent surface; a prepositioned grid arrangement placed on said flexible sleeve upper transparent surface; said grid arrangement being selectable from a variety of grid spacing options according to the ability of the user and the complexity of the original image whereby said image can be duplicated accurately by use of the shape and size of each of the transposed grid areas formed by said prepositioned grid arrangement on the plastic sleeve upper transparent surface; and a sheet for positioning and arranging material on which said image will be duplicated, said sheet removably attached substantially parallel to one side of said plastic sleeve and being suitable for drawing thereon by the user, said sheet having a prepositioned grid arrangement thereon which is identical in size and configuration to said prepositioned grid arrangement on said plastic sleeve upper transparent surface;

inserting an original image in the plastic sleeve so that the user may view the image and then outlining the basic shapes of the largest dimensions of the image using a plurality of short straight lines placed, by grid area, onto the upper transparent surface outer surface and then advancing said drawing and painting reproduction made by said person by following a series of predetermined steps that help navigate said person to a successful conclusion, said predetermined steps comprising:

a. inserting a blank sheet of paper into the plastic sleeve in a manner that conceals the original image from the person using this method;
  b. duplicating the basic shapes that were drawn on the upper transparent surface outer surface onto the attached sheet that is removably attached to the plastic sleeve;
  c. comparing, by grid area, the positive shape of the image being duplicated and the negative shape of the areas that surround the positive shape, to assess the accuracy of the duplication;
  d. correcting the duplication sequentially by grid area;
  e. partially and progressively withdrawing the blank sheet of paper from the plastic sleeve to reveal portions of the original image to be further outlined onto the upper transparent surface outer surface and then duplicated according to the above predetermined steps until the user of the method has successfully completed duplication of the original image; and
  f. identifying and correcting drawing problems of the person using the method and then having the person draw or paint using a different size of said predetermined grid arrangement, wherein a progressive increase in the size of each grid area enables skill development of the user of the method through a predetermined and dependable system.

7. The method of claim 6 in which the user is progressed from a predetermined grid arrangement having at least four grid areas to predetermined grid arrangements having less than four grid areas, wherein this progression facilitates the skill development of the user and enables duplication of the original image using methods for completing said drawing and painting reproduction as simply and accurately as possible.

8. The method of claim 6 wherein said graduated grid system is formatted to insure optimum results for all users regardless of initial ability, wherein the user is progressed from a predetermined grid arrangement having at least twenty five grid areas to predetermined grid arrangements having less than twenty five grid areas.

9. The method of claim 6 further including the steps of:
  a. providing a graduated grid oil painting palette, said palette having a printed sheet comprising a material that enables repeat cycles of paint to be used on a first surface of the sheet and then cleaned therefrom for re-use; said sheet having a pure black paint reference on a first corner and a pure white paint reference on an opposing corner; said sheet further having six value strips arranged horizontally to the user along the length of the sheet, with said value strips representing a mixing strip, a neutrals strip, a warm colors strip including yellow, orange and red, and a cool colors strip including purple, blue, and green; said value strips comprising a value scale with each strip progressing from a color tone with no white components at the left of the strip to a color tone with a high percentage of white components on the right of each strip; said sheet further having vertical dividing lines arranged to intersect the strips, said dividing lines facilitating groups of color tones referred to as dark, middle, and light; wherein the painting palette also has a predetermined amount of pure color choices marked as indicia along each of the six value strips, with a palette having more of said indicia being designed for use by less experienced users and a palette having relatively few of said indicia being designed for use by more experienced users;
  b. ensuring that the graduated grid painting palette has a requisite number of pure color choices marked as indicia according to the ability of the user;
  c. comparing the original image color that is to be duplicated by the user and determining where that color is located on the graduated grid palette; and
  d. determining whether it is necessary to lighten a pure color choice by moving up the value scale to the right of the sheet or whether it is necessary to darken a pure color choice by moving down the value scale to the left of the sheet.

10. A method for optimizing the drawing and painting capabilities of a person said method comprising the steps of: setting up a graduated grid system for use by a person in drawing and painting reproduction, said graduated grid system comprising a flexible sleeve having an upper transparent surface and a lower surface formed with at least one opening along an edge of the sleeve; the opening formed by the surfaces being sized to enable placement and removal of the original image therethrough so that the original image is visible through the upper transparent surface; the opening formed by the surfaces further being sized to permit selective insertion and removal of a blank sheet of paper therethrough so that the blank sheet of paper may be positioned between the upper transparent surface and the original image; said upper transparent surface being durable and suitable for repeat cycles of use in which a user places and removes basic image shape lines on an outer surface of the upper transparent surface; a prepositioned grid arrangement placed on said flexible sleeve upper transparent surface; said grid arrangement being selectable from a variety of grid spacing options according to the ability of the user and the complexity of the original image whereby said image can be duplicated accurately by use of the shape and size of each of the transposed grid areas formed by said prepositioned grid arrangement on the plastic sleeve upper transparent surface; and means for positioning and arranging material on which said image will be duplicated, said means comprising a sheet removably attached substantially parallel to one side of said plastic sleeve and being suitable for drawing thereon by the user, said sheet having a prepositioned grid arrangement thereon which is identical in size and configuration to said prepositioned grid arrangement on said plastic sleeve upper transparent surface;

inserting an original image in the plastic sleeve so that the user may view the image and then outlining the basic shapes of the largest dimensions of the image using a plurality of short straight lines placed, by grid area, onto the upper transparent surface outer surface and then advancing said drawing and painting reproduction made by said person by following a series of predetermined steps that help navigate said person to a successful conclusion, said predetermined steps comprising:

a. inserting a blank sheet of paper into the plastic sleeve in a manner that conceals the original image from the person using this method;

b. duplicating the basic shapes that were drawn on the upper transparent surface outer surface onto the attached sheet that is removably attached to the plastic sleeve;

c. comparing, by grid area, the positive shape of the image being duplicated and the negative shape of the areas that surround the positive shape, to assess the accuracy of the duplication;

d. correcting the duplication sequentially by grid area;

e. partially and progressively withdrawing the blank sheet of paper from the plastic sleeve to reveal portions of the original image to be further outlined onto the upper transparent surface outer surface and then duplicated according to the above predetermined steps until the user of the method has successfully completed duplication of the original image; and f. finishing said drawing reproduction in an appropriate artist's medium as faithfully and accurately as feasible, comprising ink finishing steps of:
  i. keeping the user's pen tips clean;
  ii. outlining shapes using a thin pen tip;
  iii. adding line variety using a thick pen tip;
  iv. smoothing out a line using a thin pen tip;
  v. conducting a final review of the drawing and reproduction;
  vi. blow drying the reproduction; and
  vii. erasing all pencil lines.

11. The method of claim 10 further comprising the step of preparing to finish said drawing reproduction in an appropriate artist's medium as faithfully and accurately as feasible by first increasing color sensitivity by systematic training through visual perception of color value, intensity and variation.

12. The method of claim 10 further comprising the watercolor painting finishing step of color mixing comprising the steps of
a. holding a brush back;
b. transferring enough water into a mixing tray;
c. boldly adding pigment to the water;
d. stirring the mixture of pigment and water;
e. testing the color of the mixture along an edge of the paper upon which the duplication is placed;
f. assessing the testing for lightness, darkness, and overall color suitability;
g. adding, as needed, water to lighten; pigment to darken; or black to dull; and
h. conducting a final review of the watercolor mixing.

13. The method of claim 12 further including methods to ensure success when using the watercolor mixture to paint, comprising:

a. working with the brush fully loaded with wet paint of the color mixed;
b. consistently stirring the color mixture;
c. directionally working from top to bottom;
d. maintaining the paper at a 30 degree angle;
e. overlapping each stroke by 50 percent;
f. keeping all of the wash moving down together;
g. continuing until all the wash is finished;
h. soaking up any extra paint; and
i. working always from light to dark and from large to small.

14. The method of claim 10 wherein said graduated grid system is formatted to insure optimum results for all users regardless of initial ability, wherein the user is progressed from a predetermined grid arrangement having at least twenty five grid areas to predetermined grid arrangements having less than twenty five grid areas.

15. The method of claim 10 further including the steps of:
a. providing a graduated grid oil painting palette, said palette having a printed sheet comprising a material that enables repeat cycles of paint to be used on a first surface of the sheet and then cleaned therefrom for re-use; said sheet having a pure black paint reference on a first corner and a pure white paint reference on an opposing corner; said sheet further having six value strips arranged horizontally to the user along the length of the sheet, with said value strips representing a mixing strip, a neutrals strip, a warm colors strip including yellow, orange and red, and a cool colors strip including purple, blue, and green; said value strips comprising a value scale with each strip progressing from a color tone with no white components at the left of the strip to a color tone with a high percentage of white components on the right of each strip; said sheet further having vertical dividing lines arranged to intersect the strips, said dividing lines facilitating groups of color tones referred to as dark, middle, and light; wherein the painting palette also has a predetermined amount of pure color choices marked as indicia along each of the six value strips, with a palette having more of said indicia being designed for use by less experienced users and a palette having relatively few of said indicia being designed for use by more experienced users;
b. ensuring that the graduated grid painting palette has a requisite number of pure color choices marked as indicia according to the ability of the user;
c. comparing the original image color that is to be duplicated by the user and determining where that color is located on the graduated grid palette; and
d. determining whether it is necessary to lighten a pure color choice by moving up the value scale to the right of the sheet or whether it is necessary to darken a pure color choice by moving down the value scale to the left of the sheet.

16. A method for optimizing the drawing and painting capabilities of a person said method comprising the steps of:
setting up a graduated grid system for use by a person in drawing and painting reproduction, said graduated grid system comprising a flexible sleeve having an upper transparent surface and a lower surface formed with at least one opening along an edge of the sleeve; the opening formed by the surfaces being sized to enable placement and removal of the original image therethrough so that the original image is visible through the upper transparent surface; the opening formed by the surfaces further being sized to permit selective insertion and removal of a blank sheet of paper therethrough so that the blank sheet of paper may be positioned between the upper transparent surface and the original image; said upper transparent surface being durable and suitable for repeat cycles of use in which a user places and removes basic image shape lines on an outer surface of the upper transparent surface; a prepositioned grid arrangement placed on said flexible sleeve upper transparent surface; said grid arrangement being selectable from a variety of grid spacing options according to the ability of the user and the complexity of the original image whereby said image can be duplicated accurately by use of the shape and size of each of the transposed grid areas formed by said prepositioned grid arrangement on the plastic sleeve upper transparent surface; and a sheet for positioning and arranging material on which said image will be duplicated, said sheet removably attached substantially parallel to one side of said plastic sleeve and being suitable for drawing thereon by the user, said sheet having a prepositioned grid arrangement thereon which is identical in size and configuration to said prepositioned grid arrangement on said plastic sleeve upper transparent surface;

inserting an original image in the plastic sleeve so that the user may view the image and then outlining the basic shapes of the largest dimensions of the image using a plurality of short straight lines placed, by grid area, onto the upper transparent surface outer surface and then advancing said drawing and painting reproduction made by said person by following a series of predetermined steps that help navigate said person to a successful conclusion, said predetermined steps comprising:

a. inserting a blank sheet of paper into the plastic sleeve in a manner that conceals the original image from the person using this method;

b. duplicating the basic shapes that were drawn on the upper transparent surface outer surface onto the attached sheet that is removably attached to the plastic sleeve;

c. comparing, by grid area, the positive shape of the image being duplicated and the negative shape of the areas that surround the positive shape, to assess the accuracy of the duplication;

d. correcting the duplication sequentially by grid area; and e. partially and progressively withdrawing the blank sheet of paper from the plastic sleeve to reveal portions of the original image to be further outlined onto the upper transparent surface outer surface and then duplicated according to the above predetermined steps until the user of the method has successfully completed duplication of the original image;

f. providing a graduated grid oil painting palette, said palette having a printed sheet comprising a material that enables repeat cycles of paint to be used on a first surface of the sheet and then cleaned therefrom for re-use; said sheet having a pure black paint reference on a first corner and a pure white paint reference on an opposing corner; said sheet further having six value strips arranged horizontally to the user along the length of the sheet, with said value strips representing a mixing strip, a neutrals strip, a warm colors strip including yellow, orange and red, and a cool colors strip including purple, blue, and green; said value strips comprising a value scale with each strip progressing from a color tone with no white components at the left of the strip to a color tone with a high percentage of white components on the right of each strip; said sheet further having vertical dividing lines arranged to intersect the strips, said dividing lines facilitating groups of color tones referred to as dark, middle, and light; wherein the painting palette also has a predetermined amount of pure color choices marked as indicia along each of the six value strips, with a palette having more of said indicia being designed for use by less experienced users and a palette having relatively few of said indicia being designed for use by more experienced users;

g. ensuring that the graduated grid painting palette has a requisite number of pure color choices marked as indicia according to the ability of the user;

h. comparing the original image color that is to be duplicated by the user and determining where that color is located on the graduated grid palette; and i. determining whether it is necessary to lighten a pure color choice by moving up the value scale to the right of the sheet or whether it is necessary to darken a pure color choice by moving down the value scale to the left of the sheet.

17. The method of claim 16 further comprising the steps of:

a. comparing the original image color intensity that is to be duplicated by the user and determining where that color intensity choice is located on the graduated grid palette; and b. determining whether it is necessary to brighten a color intensity choice by adding more of that color or whether it is necessary to dull a color choice by adding some gray of the same value on the value scale.

18. The method of claim 17 further comprising the steps of:

a. comparing the original image color that is to be duplicated by the user and determining where the closest color choice is located on the graduated grid palette;

b. determining whether the closest color choice is still different from the original image color, and if the closest color choice appears to contain too much of a color in an immediately adjacent value strip but within the same band of dark, medium or light as the closest color choice; then c. adding some color from the other immediately adjacent value strip to the closest color choice opposite from the value strip containing the excess color that is in the closest color choice but at the same value on the value scale.

19. A kit for use in enhancing drawing and painting skill development for users, said kit comprising:

a. a pliable sleeve having an upper transparent surface and a lower surface formed with at least one opening along an edge of the sleeve; the opening formed by the surfaces being sized to enable placement and removal of an original image therethrough so that the original image is visible through the upper transparent surface; the opening formed by the surfaces further being sized to permit selective insertion and removal of a blank sheet of paper therethrough so that the blank sheet of paper may be positioned between the upper transparent surface and the original image; said upper transparent surface being durable and suitable for repeat cycles of use in which a user places and removes basic image shape lines on an outer surface of the upper transparent surface;

b. a prepositioned grid arrangement placed on said plastic sleeve upper transparent surface; said grid arrangement being selectable from a variety of grid spacing options according to the ability of the user and the complexity of the original image, wherein the selected grid creates a plurality of grid areas;

c. a sheet removably attachable in a manner substantially parallel to one side of said plastic sleeve and being suitable for drawing thereon by the user, said sheet having a prepositioned grid arrangement thereon which is identical in size and configuration to said prepositioned grid arrangement on said plastic sleeve upper transparent surface; and d. at least one pair of shape isolators each formed as a geometric shape having an outer circumferential dimension that is larger than any designated grid area formed by said prepositioned grid arrangement, and an inner dimension formed so as to create an opening sized to view a complete area of a designated grid area therethrough when said shape isolator is placed over the designated grid area, each of said isolators in a pair being identical for simultaneous use over said plastic sleeve upper transparent surface and said sheet suitable for drawing thereon by said user, wherein the material that forms each shape isolator between said outer circumferential dimension and said inner dimension being formed of material that blocks the view by the user of any underlying image; and e. a graduated grid oil painting palette, said palette comprised of a printed sheet covered with a material that enables repeat cycles of paint to be used on a first surface of the sheet and then cleaned therefrom for re-use; said sheet having a pure black color reference on a first corner and a pure white color reference on an opposing corner; said sheet further having six value strips arranged horizontally to the user along the length of the sheet, with said value strips representing a mixing strip, a neutrals strip, a warm colors strip including yellow, orange and red, and a cool colors strip including purple, blue, and green; said strips comprising a value scale with each strip progressing from a color tone with no white components at the left of the strip to a color tone with a high percentage of white components on the right of each strip; said sheet further having vertical dividing lines arranged to intersect the strips, said dividing lines facilitating groups of color tones referred to as dark, middle, and light; wherein the graduated grid painting palette also has a predetermined amount of pure color choices marked as indicia along each of the color value strips, with a palette having more of said indicia being designed for use by less experienced users and a palette having relatively few of said indicia being designed for use by more experienced users.

20. The kit of claim 19 further comprising additional pairs of shape isolators having, by pair, progressively larger sized inner dimensions to form larger sized openings therein, thereby enabling the user to progressively see larger areas in isolation as the skills of the user increase.

* * * * *